(12) United States Patent
Oliveira et al.

(10) Patent No.: US 7,756,148 B1
(45) Date of Patent: *Jul. 13, 2010

(54) MULTI-THREADED FIFO MEMORY GENERATOR WITH SPECULATIVE READ AND WRITE CAPABILITY

(75) Inventors: Marcio T. Oliveira, San Jose, CA (US); Robert A. Alfieri, Chapel Hill, NC (US)

(73) Assignee: NVIDIA Corporation, Santa Clara, CA (US)

( * ) Notice: Subject to any disclaimer, the term of this patent is extended or adjusted under 35 U.S.C. 154(b) by 391 days.

This patent is subject to a terminal disclaimer.

(21) Appl. No.: 11/760,699

(22) Filed: Jun. 8, 2007

Related U.S. Application Data

(63) Continuation-in-part of application No. 11/399,247, filed on Apr. 6, 2006, which is a continuation-in-part of application No. 11/304,959, filed on Dec. 14, 2005.

(51) Int. Cl.
*H04L 12/28* (2006.01)

(52) U.S. Cl. .......................... 370/412; 370/428; 710/52
(58) Field of Classification Search ...................... None
See application file for complete search history.

(56) References Cited

U.S. PATENT DOCUMENTS

2005/0114612 A1 * 5/2005 Bombal ...................... 711/154

* cited by examiner

*Primary Examiner*—Bob A Phunkulh
(74) *Attorney, Agent, or Firm*—Patterson & Sheridan, LLP

(57) ABSTRACT

Systems and methods for generating synthesizable code representing first-in first-out (FIFO) memories may be used to produce FIFO memories for multi-threaded processing. A single FIFO memory is shared between the threads to conserve die area, however each thread may be executed independently, as if each thread has a dedicated FIFO memory. A synthesizable code generator produces synthesizable code for a sender interface, storage, receiver interface, and other features that are specified by a programmer. The other features may reduce power consumption or improve timing. The code generator is used to efficiently produce different variations of FIFO memories.

20 Claims, 21 Drawing Sheets

MULTI-THREADED FIFO MEMORY GENERATOR WITH SPECULATIVE READ AND WRITE CAPABILITY

CROSS-REFERENCE TO RELATED APPLICATIONS

This application is a continuation-in-part of co-pending U.S. patent application titled, "A Multi-Threaded FIFO Memory Generator," filed Apr. 6, 2006 and having Ser. No. 11/399,247, which is a continuation-in-part of co-pending U.S. patent application titled, "A Multi-Threaded FIFO Memory," filed Dec. 14, 2005 and Ser. No. 11/304,959. The aforementioned related patent applications are herein incorporated by reference.

BACKGROUND OF THE INVENTION

1. Field of the Invention

Embodiments of the present invention generally relate to automatic generation of data storage for multi-threaded processing and, more specifically, to generators that produce synthesizable code for a first-in first-out (FIFO) memory.

2. Description of the Related Art

Integrated circuits designed to process data typically use FIFO memories to store data between processing stages. These FIFO memories may have different widths, depths, and different input and output clock frequencies. Conventionally, generators that produce synthesizable code have been used to efficiently produce different variations of FIFO memories. More recently, multi-threaded processing systems use a separate FIFO memory to store data for each processing thread. Using separate FIFOs permits data for a thread to be accessed independently from data for another thread. This independence is essential since during multi-threaded processing, each thread may be executed at a different rate and data may be stored in or read from the FIFOs at different rates. However, using separate FIFOs for each thread uses more die area than using a single FIFO to store data for multiple threads. The conventional generators do not produce synthesizable code for a FIFO that may be used to store data for multiple threads and allow the data for each thread to be accessed independently.

Accordingly, there is a desire to use a FIFO memory generator to produce synthesizable code for a shared FIFO to store data for multiple threads.

SUMMARY OF THE INVENTION

The current invention involves new systems and methods for generating synthesizable code representing FIFO memories to store data for multi-threaded processing. A single FIFO memory that can simultaneously store data for multiple threads is produced by synthesizing the generated code. A synthesizable code generator produces synthesizable code for a sender interface, storage, receiver interface, and other features that are specified by a programmer. The other features may reduce power consumption or improve timing. The code generator is used to efficiently produce different variations of FIFO memories. Specifically, the sender interface may include a speculative write capability and the receiver interface may include a speculative read capability.

Various embodiments of a method of the invention for generating synthesizable code representing a multi-threaded FIFO (first-in first-out memory) storage include generating a first, second, and third portion of the synthesizable code. The first portion of the synthesizable code represents a sender interface with a first thread identifier input port and a write data input port that is configured to receive data for multiple execution threads. The second portion of the synthesizable code represents a storage resource configured to store the data for the multiple execution threads in a shared memory. The third portion of the synthesizable code represents a receiver interface with a second thread identifier input port, a speculative read port that is configured to provide a rollback capability for entries in the storage resource, and a read data output port that is configured to output the data for the multiple execution threads that corresponds to a thread identifier received by the second thread identifier input port.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

The current invention involves new systems and methods for efficiently producing different variations of FIFO memories. In particular, a synthesizable code generator may be used to produce FIFO memories for multi-threaded processing. A single FIFO memory is shared between the threads to conserve die area. However, each thread may be executed independently, as if each thread has a dedicated FIFO memory. A synthesizable code generator produces synthesizable code for a sender interface, storage, receiver interface, and other features that are specified by a programmer. The sender interface may include a speculative write capability to allow write data to be stored in the FIFO memory and discarded before it is accessed by the receiver interface. The receiver interface may include a speculative read capability to allow read data to remain in the FIFO memory after it is read and removed from the FIFO memory at a later time.

Figure 1A:
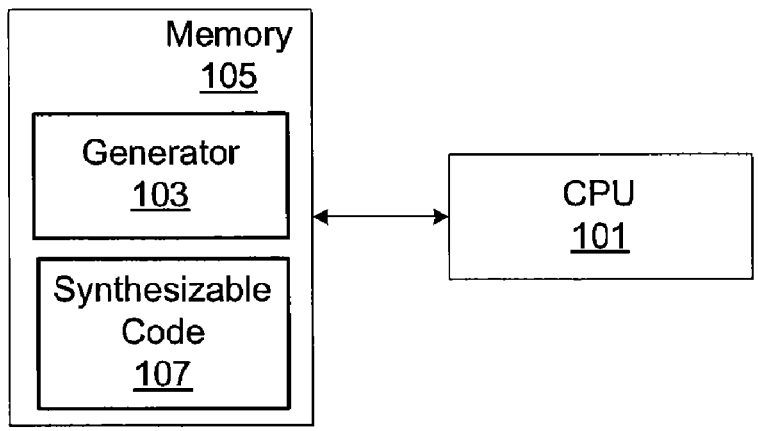
FIG. 1A illustrates a block diagram of a computing system including a synthesizable code generator in accordance with one or more aspects of the present invention.

FIG. 1A illustrates a block diagram of a computing system including a central processing unit (CPU) 101 and a system memory 105, in accordance with one or more aspects of the present invention. A generator program, generator 103 is stored in memory 105. When executed by CPU 101, generator 103 produces synthesizable code 107 representing a FIFO memory. Synthesizable code 107 may be combined with other code, produced by a generator program or authored by a programmer, to produce synthesizable code for an integrated circuit. Synthesizable code 107 may be written in Verilog, VHDL, or other hardware description languages known to those skilled in the art. Synthesizable code 107 may be synthesized using a commercially available synthesis tools such as Design Compiler® produced by Synopsys and Synplify® produced by Synplicity, to produce a netlist defining the components and connections of the integrated circuit.

Figure 1B:
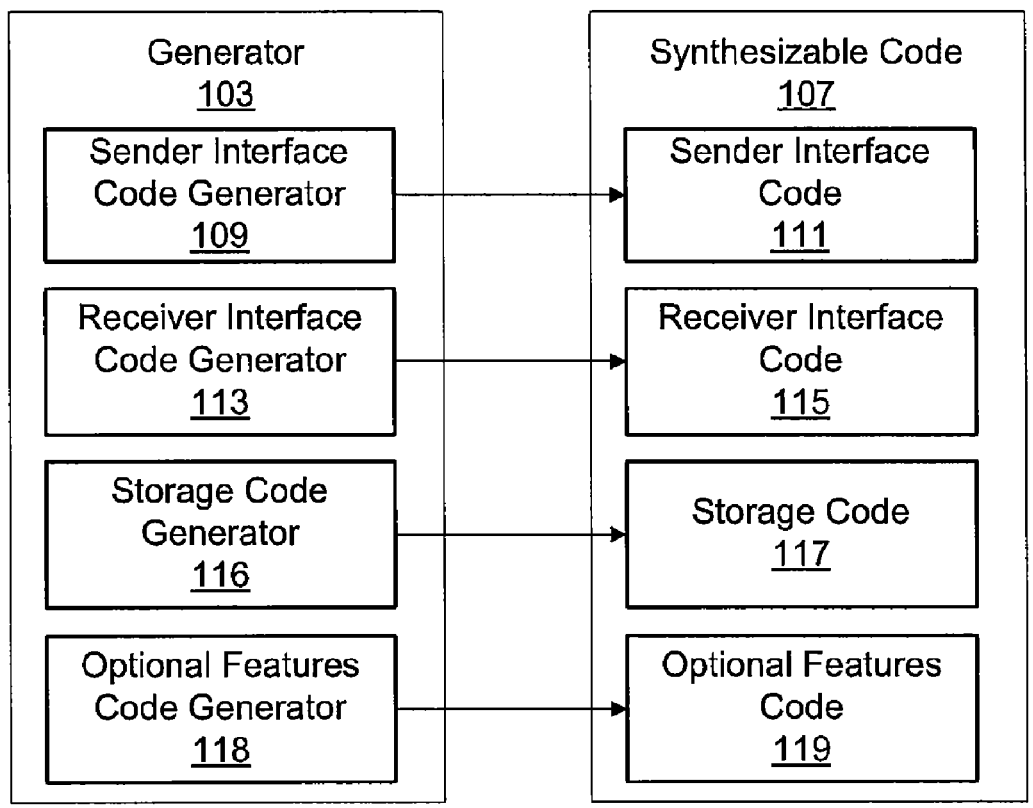
FIG. 1B illustrates the synthesizable code generator and synthesized code shown in FIG. 1A in accordance with one or more aspects of the present invention.

FIG. 1B illustrates synthesizable code generator 103 and synthesized code 107 of FIG. 1A, in accordance with one or more aspects of the present invention. Generator 103 includes components (generators) that are used to produce corresponding components of synthesizable code 107. In particular, a first portion of generator 103, sender interface code generator 109 produces synthesizable sender interface code 111 when executed by CPU 101. A second portion of generator 103, receiver interface code generator 113 produces synthesizable receiver interface code 115 when executed by CPU 101. A third portion of generator 103, storage code generator 116 produces synthesizable storage code 117 when executed by CPU 101. A fourth portion of generator 103, optional features code generator 118 produces synthesizable optional features code 119 when executed by CPU 101.

Storage code 117 is used to synthesize (or instantiate) the storage resources within the FIFO memory, e.g., flip flops, registers, latches, random access memory (RAM), or the like. Sender interface code 111 is used to synthesize the input interface that receives data for storage in the FIFO memory. Receiver interface code 115 is used to synthesize the output interface that outputs data that is stored in the FIFO memory. Optional features code 119 is used to synthesize logic for a multi-threaded FIFO memory that permits storage and access of data for multiple execution threads in a single storage resource. Optional features code 119 may also be used to synthesize logic to reduce power consumption, improve interface timing, include asynchronous interfaces, or the like. For example, flip flops may be used to receive or output data to improve interface timing. Clock gating may be added to reduce power consumption for portions of the FIFO memory that are idle or static.

Figure 1C:
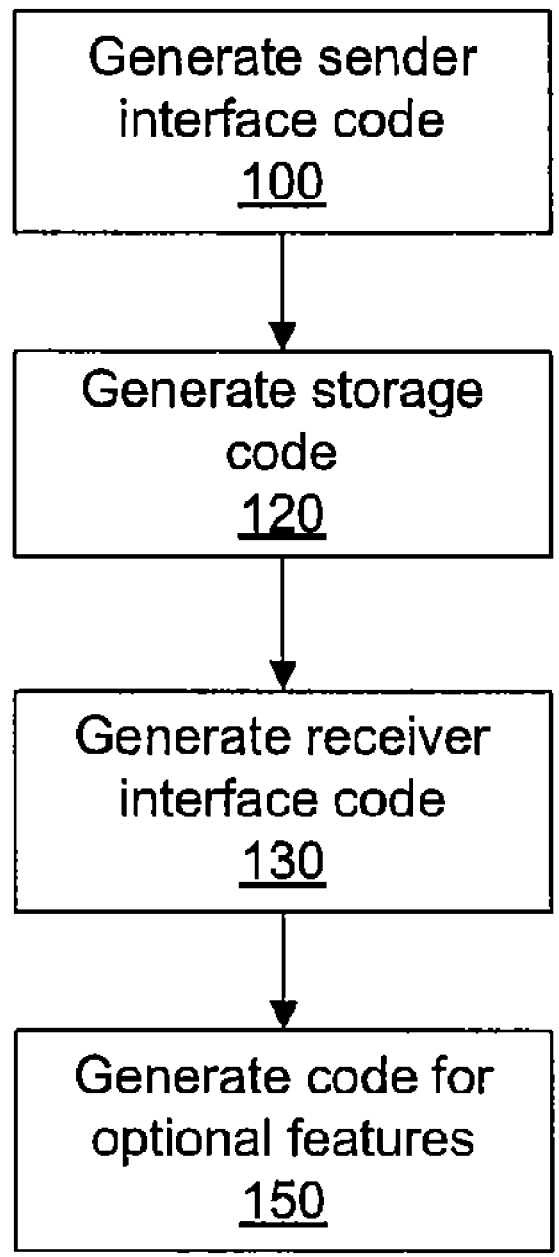
FIG. 1C illustrates a flow diagram of an exemplary method of generating synthesizable code for a FIFO memory in accordance with one or more aspects of the present invention.

FIG. 1C illustrates a flow diagram of an exemplary method of generating synthesizable code for a FIFO memory in accordance with one or more aspects of the present invention. In step 100 sender interface code generator 109 is executed to produce sender interface code 111. In step 120 storage code generator 116 is executed to produce storage code 117. In step 130 receiver interface code generator 113 is executed to produce receiver interface code 115. In step 150 optional features code generator 118 is executed to produce optional features code 119. Steps 100, 120, 130, and 150 are described in further detail in conjunction with FIGS. 1D, 1E, 1F, and 1G, respectively.

Figure 1D:
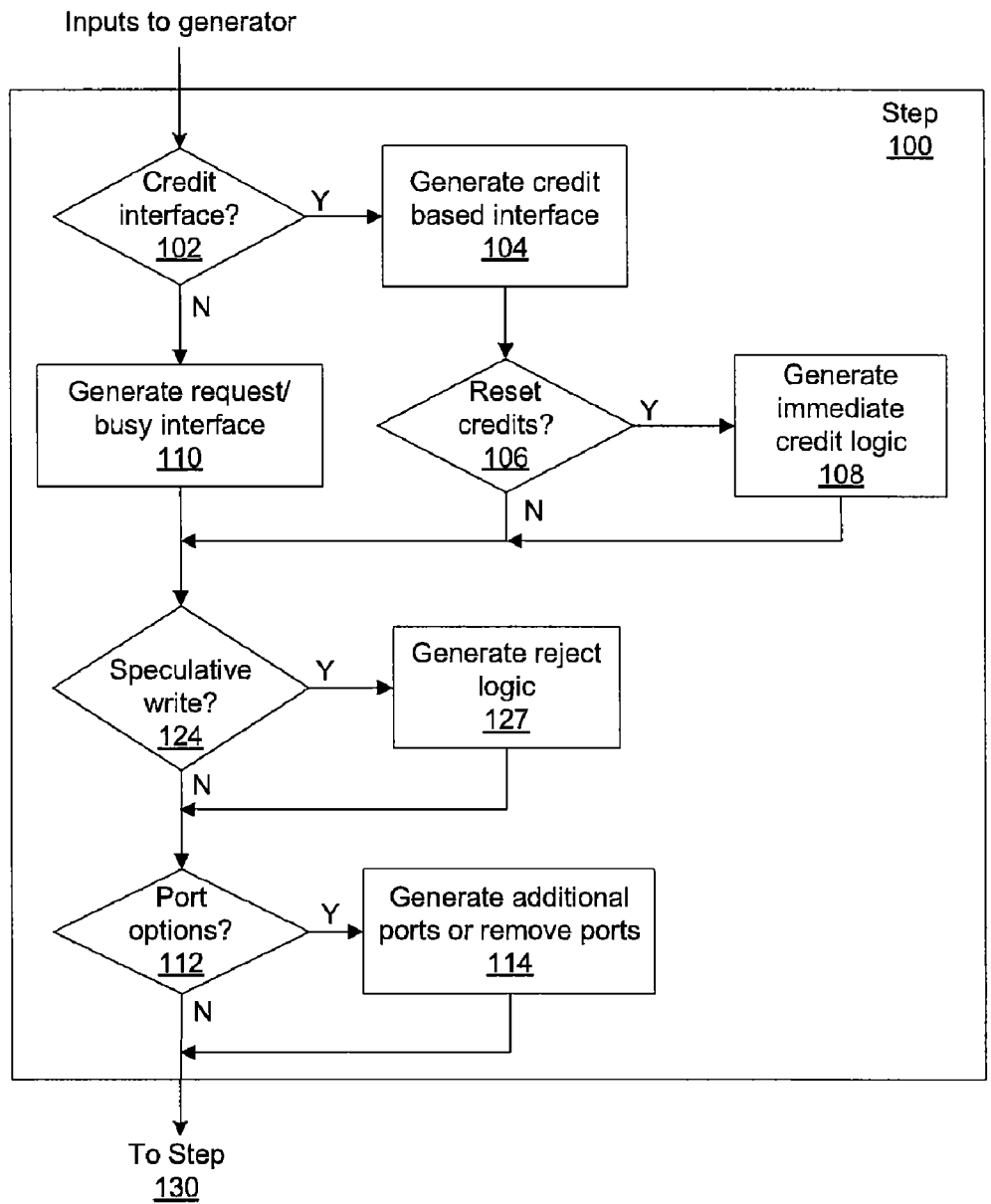
FIG. 1D illustrates a flow diagram of an exemplary method of performing step 100 shown in FIG. 1C in accordance with one or more aspects of the present invention.

FIG. 1D illustrates a flow diagram of an exemplary method of performing step 100 shown in FIG. 1C in accordance with one or more aspects of the present invention. In step 102 the inputs provided to generator 103 are examined to determine if a credit based sender interface is specified. The inputs may be received from a user via a command line interface or may be generated by another generator that produces a higher level of the hierarchy of the integrated circuit. If, in step 102 generator 103 determines that a credit based interface is specified, then in step 104 sender interface code generator 109 is executed to produce sender interface code 111 including a credit based interface. The functions performed by a credit based sender interface are described in more detail in conjunction with FIG. 3A.

In step 106, generator 103 determines if the reset credit option is specified for the sender credit based interface, and, if so, in step 108 sender interface code generator 109 is executed to produce sender interface code 111 including immediate credit logic. The immediate credit logic outputs one or more sender credits to the sender immediately after coming out of reset. If, in step 106 generator 103 determines that the reset credit option is not specified for the sender credit based interface, then generator 103 proceeds to step 124.

If, in step 102 generator 103 determines that a credit based interface is not specified, then in step 110 sender interface code generator 109 is executed to produce sender interface code 111 including a request/busy interface. In one embodiment of the present invention, a busy signal is output by the sender interface and the sender interface accepts requests only when busy is negated, i.e., when busy is asserted requests are ignored. In other embodiments of the present invention, other sender interface types may be defined and specified.

In step 124 generator 103 determines if a speculative write capability is specified, and, if so, in step 127 a commit port and a reject port is added. The commit port is used to postpone writing to the storage resource until the commit signal is asserted. The reject port is used to reject all writes received that have not been committed using the commit port. A reject pointer is maintained that is updated whenever a write is committed. The speculative write option is useful for packet processing applications since incoming packets may be stored and later rejected, such as when a packet fails an error checking test. If, in step 124 generator 103 determines that a speculative write capability is not specified, then generator 103 proceeds directly to step 112.

In step 112 generator 103 determines if one or more port options are specified, and, if so, in step 114 sender interface code generator 109 is executed to produce sender interface code 111 including the additional ports. For example, an idle port (for all or each thread) may be included in the sender interface to indicate when the sender interface is idle. An empty port may also be included in the sender interface to indicate that the storage resource is empty. A write count port (for all or each thread) may also be included in the sender to indicate the number of entries in the storage resource that are used. The storage resource write address, read address, pop, push, and the like may also be output via ports of the sender interface. These additional ports may be used during functional verification or may be used by the sender to perform performance optimizations.

In other embodiments of the present invention, other options may be specified for inclusion in the sender interface. For example, a limit value may be defined to artificially limit the number of entries that may be used, i.e., credits issued, in the FIFO memory. A partial write option may be specified to enable writes of one or more portions of an entry and write enable ports are included in the sender interface corresponding to the one or more portions. The polarity of the busy signal may be reversed when a request/busy sender interface is specified. Another option may be used to specify that the busy signal of a request/busy sender interface is associated with the next clock cycle instead of the current clock cycle. Sender interface code generator 109 may be configured to produce sender interface code 111 based on a variety of options specified by inputs to generator 103. Therefore, generator 103 may be used to efficiently produce FIFO memories with many different features.

Figure 1E:
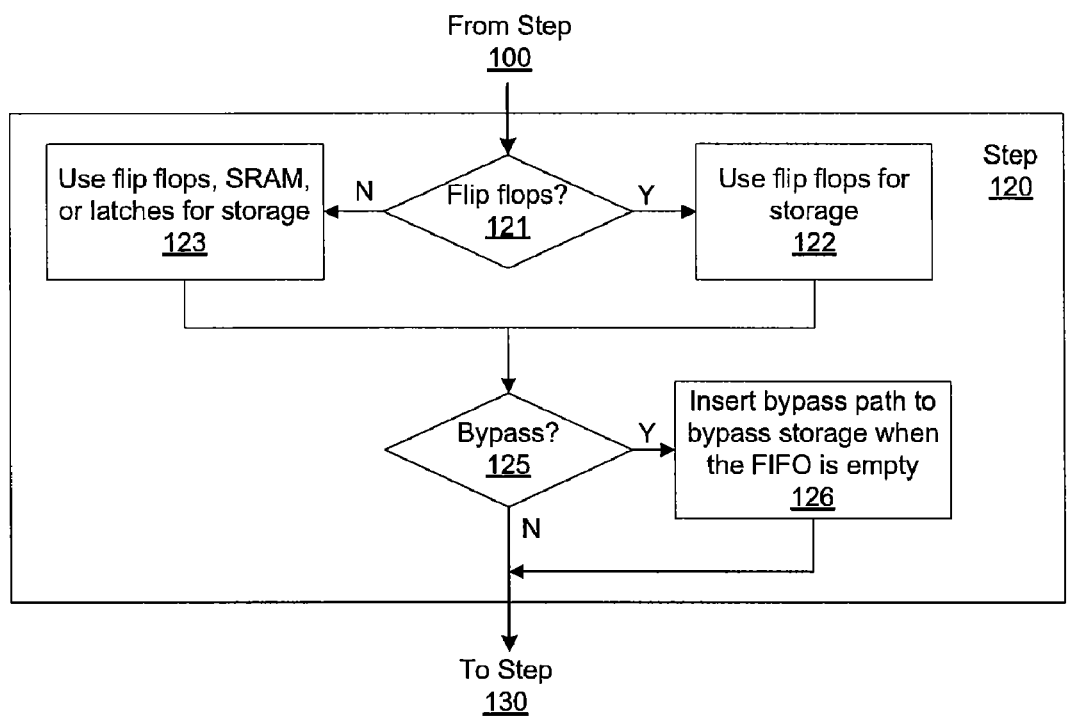
FIG. 1E illustrates a flow diagram of an exemplary method of performing step 120 shown in FIG. 1C in accordance with one or more aspects of the present invention.

FIG. 1E illustrates a flow diagram of an exemplary method of performing step 120 shown in FIG. 1C in accordance with one or more aspects of the present invention. In step 121 the inputs provided to generator 103 are examined to determine if a flip flop based storage resource is specified, and, if so, in step 122 storage code generator 116 is executed to produce storage code 117 to specify flip flops as the storage devices. If, in step 122 the inputs provided to generator 103 do not specify using flip flop based storage devices, then in step 123 storage code generator 116 is executed to produce storage code 117 to select the storage device, e.g., flip flop, RAM, latches, or the like, based on criterion provided to storage code 117, e.g., minimal die area, maximum speed, or the like.

In step 125 generator 103 determines if bypass option is specified for the storage resource, and, if not, generator 103 proceeds to step 130. Otherwise, in step 126, storage code generator 116 is executed to produce storage code 117 including a bypass path to bypass the storage when the FIFO memory is empty. The bypass option may be used to reduce latency through the FIFO memory when the FIFO memory is empty. In other embodiments of the present invention, additional options may be specified. For example, multiple read and/or write ports may be included in storage code 117.

Figure 1F:
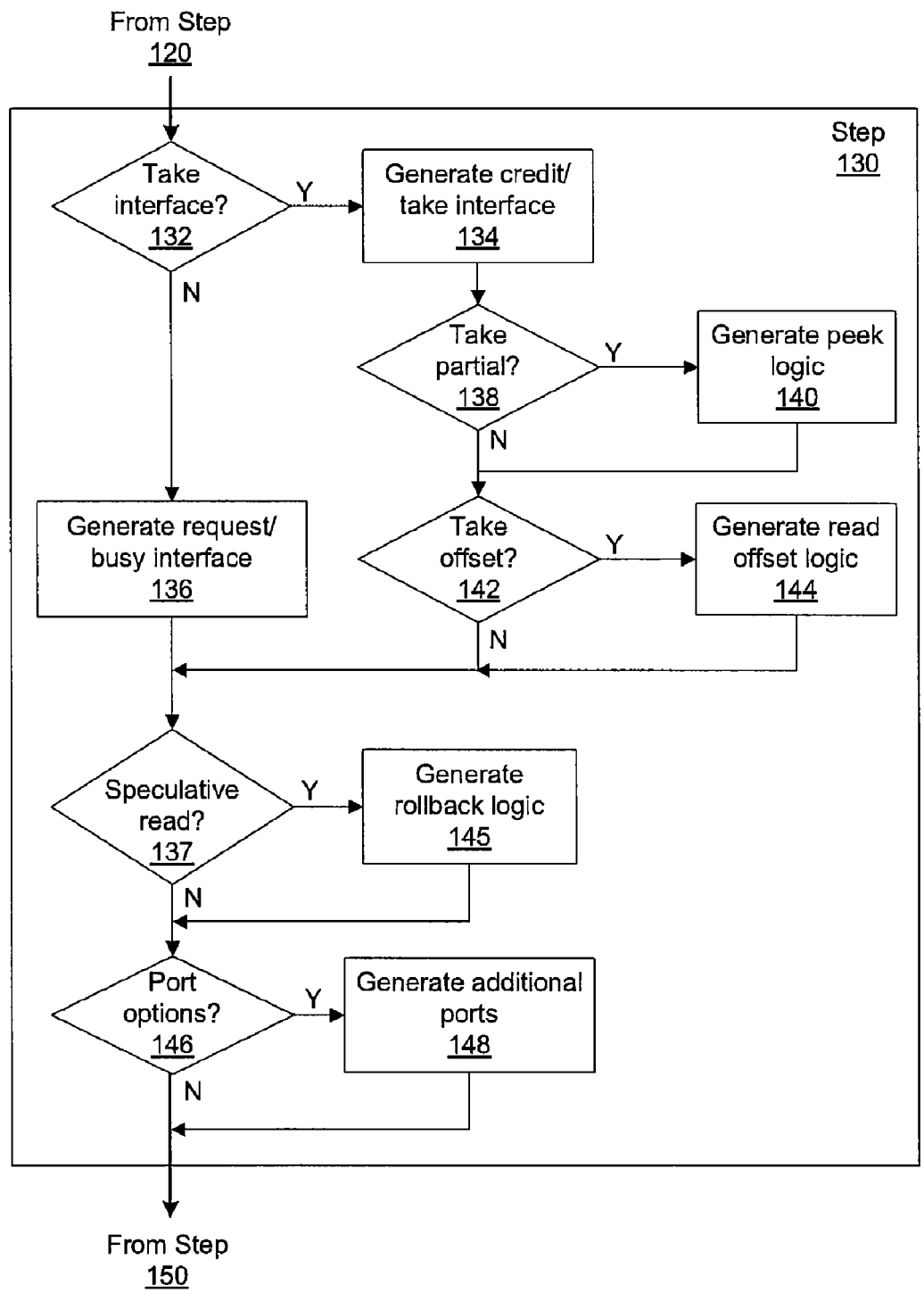
FIG. 1F illustrates a flow diagram of an exemplary method of performing step 130 shown in FIG. 1C in accordance with one or more aspects of the present invention.

FIG. 1F illustrates a flow diagram of an exemplary method of performing step 130 shown in FIG. 1C in accordance with one or more aspects of the present invention. In step 132 the inputs provided to generator 103 are examined to determine if a take based receiver interface is specified, and, if not, in step 110 receiver interface code generator 113 is executed to produce receiver interface code 115 including a request/busy interface. In some embodiments of the present invention, a credit based receiver interface may be specified. A credit based receiver interface receives credits from the receiver and maintains a credit count for each thread. The receiver interface outputs data from the FIFO memory for a thread when a credit is available for the thread and updates the credit count for the thread.

If, in step 132 generator 103 determines that a take based interface is specified, then in step 134 receiver interface code generator 113 is executed to produce receiver interface code 115 including a take based interface. The functions performed by a take based receiver interface are described in more detail in conjunction with FIG. 4A. The basic function of a take based interface is that a take output signal is pulsed when a new entry is available in the FIFO memory. When the FIFO memory is configured as a multi-threaded FIFO memory the take port includes a bit for each thread.

In step 138, generator 103 determines if the take partial option is specified for the receiver take based interface, and, if so, in step 140 receiver interface code generator 113 is executed to produce receiver interface code 115 including peek logic. The peek logic allows a receiver to read data from the FIFO memory without popping (removing) the data from the FIFO memory. In some embodiments of the present invention, data is popped when the take signal is asserted and peeked when the take partial signal is asserted and the take signal is negated. The functions performed by the take partial feature in a take based receiver interface are described in more detail in conjunction with FIG. 4C. If, in step 138 generator 103 determines that the take partial option is not specified for the take based receiver interface, then generator 103 proceeds directly to step 142.

In step 142, generator 103 determines if the take offset option is specified for the receiver take based interface, and, if so, in step 144 receiver interface code generator 113 is executed to produce receiver interface code 115 including read offset logic. The read offset logic allows a receiver to read data from any location of the FIFO memory. Data is read (peeked or popped) from the FIFO base+offset entry. The functions performed by the take offset feature in a receiver interface are described in more detail in conjunction with FIGS. 5C, 6C, and 6D. If, in step 142 generator 103 determines that the take offset option is not specified for the take based receiver interface, then generator 103 proceeds directly to step 137.

In step 137 generator 103 determines if a speculative read capability is specified, and, if so, in step 145 a commit port, a rollback port and rollback logic is added. The commit port is used to postpone removing data that is read from the storage resource until the commit signal is asserted. The rollback port is used to restore the read pointer to point to the first data that has not been removed as a result of a commit signal. A rollback pointer to an entry in the FIFO memory is incremented when the commit signal is asserted and the current read pointer is set to the rollback pointer when the rollback signal is asserted. When the speculative read capability is specified for the receiver interface, the take port may be configured to read data without removing it from the FIFO memory. The speculative read option is useful for reducing the size of buffers needed to receive data that is popped from the FIFO memory since data is read, but not popped until later, using the commit port. If, in step 124 generator 103 determines that a speculative read capability is not specified, then generator 103 proceeds directly to step 146.

In step 146 generator 103 determines if one or more port options are specified, and, if so, in step 148 receiver interface code generator 113 is executed to produce receiver interface code 115 including additional ports or removing ports. For example, the credit port(s) may be omitted from the receiver interface. When several FIFO memories are used in parallel, only a credit port from one of the FIFO memories may be used for the receivers. Similarly, the busy input signal may be omitted for the request/busy interface. A read count port (for all or each thread) may also be included in the receiver interface to indicate the number of entries in the storage resource that are used. A free count port (for all or each thread) may also be included in the receiver interface to indicate the number of entries in the storage resource that are available for storage. The storage resource read address, pop, enable, and the like may also be output via ports of the receiver interface.

In other embodiments of the present invention, other options may be specified for inclusion in the receiver interface. For example, a replay port may be specified as an input that causes data to be read from the FIFO memory using a secondary pointer. An ignore read credits option may be specified to cause the receiver interface to output data whenever it is available, regardless of the number of input read credits a receiver has provided to the receiver interface. Another option may be used to specify that the busy input signal of a request/busy receiver interface is associated with the next clock cycle instead of the current clock cycle. Like sender interface code generator 109, receiver interface code generator 113 may be configured to produce receiver interface code 115 based on a variety of options specified by inputs to generator 103. Therefore, generator 103 may be used to efficiently produce FIFO memories with many different features.

Figure 1G:
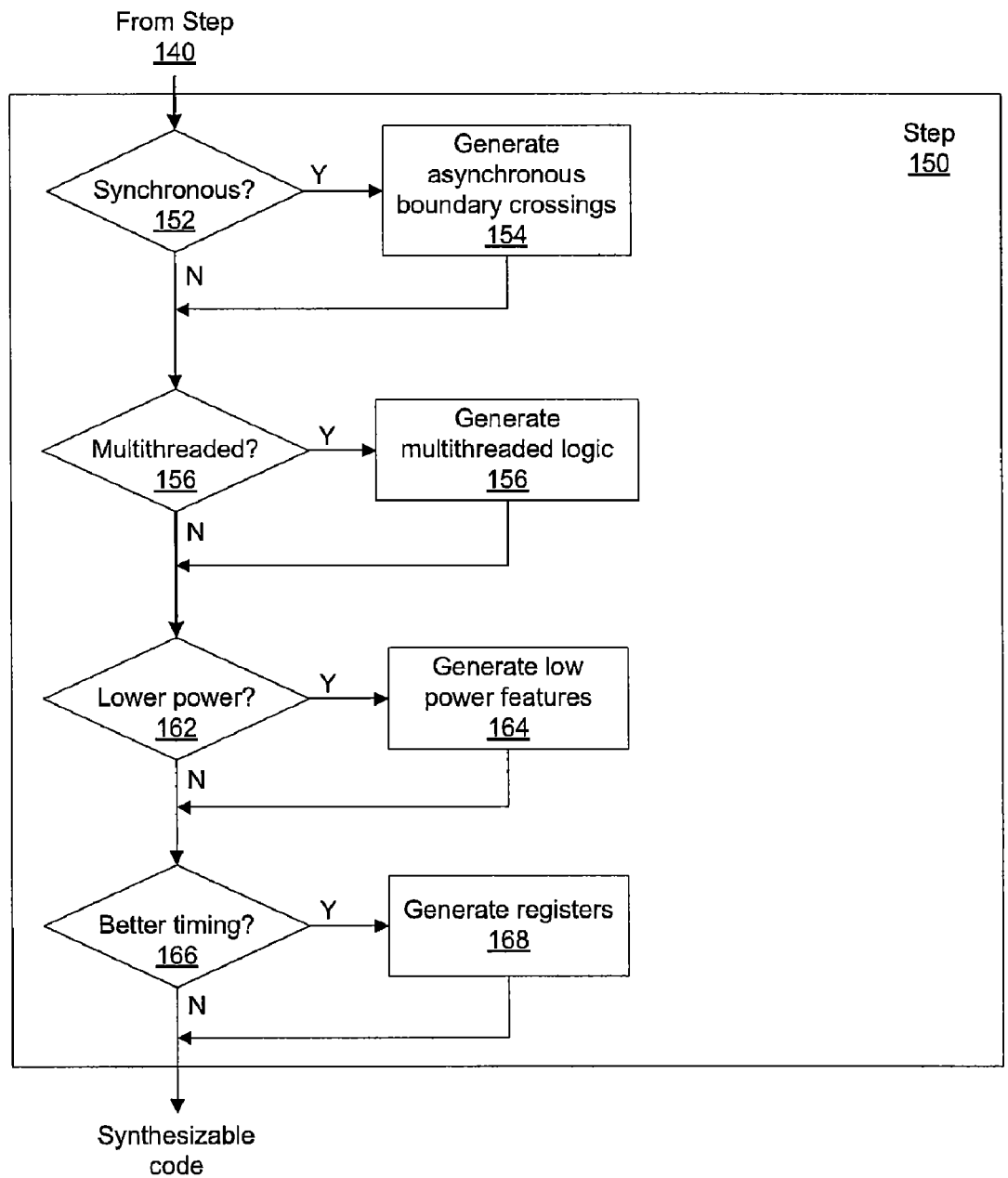
FIG. 1G illustrates a flow diagram of an exemplary method of performing step 150 shown in FIG. 1C in accordance with one or more aspects of the present invention.

FIG. 1G illustrates a flow diagram of an exemplary method of performing step 150 shown in FIG. 1C in accordance with one or more aspects of the present invention. In step 152 generator 103 determines if an asynchronous boundary option is specified for the FIFO memory, and, if not, generator 103 proceeds to step 156. Otherwise, in step 154, optional features code generator 118 is executed to produce optional features code 119 including asynchronous boundary interfaces to transfer signals between two different clock domains (the sender clock domain and the receiver clock domain).

In step 156 generator 103 determines if a multi-threaded option is specified for the FIFO memory, and, if not, generator 103 proceeds to step 162. Otherwise, in step 156 optional features code generator 118 is executed to produce optional features code 119 including multi-threaded logic. In particular, an ordered pointer list is included which stores pointers to the entries in the storage resource and is used to maintain per-thread linked lists to emulate per-thread FIFOs. The multithreaded logic is described in greater detail in conjunction with FIG. 5B.

In step 162 generator 103 determines if a lower power option is specified for the FIFO memory, and, if not, generator 103 proceeds to step 166. Otherwise, in step 164 optional features code generator 118 is executed to produce optional features code 119 including adding clock gating. In particular fine grained clock gating may be inserted for data input to the receiver interface. In step 166 generator 103 determines if a better timing option is specified for the FIFO memory, and, if not, generator 103 proceeds to step 166. Otherwise, in step 164 optional features code generator 118 is executed to produce optional features code 119 including inserting registers on input and output signals and to duplicate signals with multiple loads. In other embodiments of the present invention, additional options may be defined. After completing step 166 and/or 168, synthesizable optional features code 119 is output and synthesizable code 107 is complete.

Figure 1H:
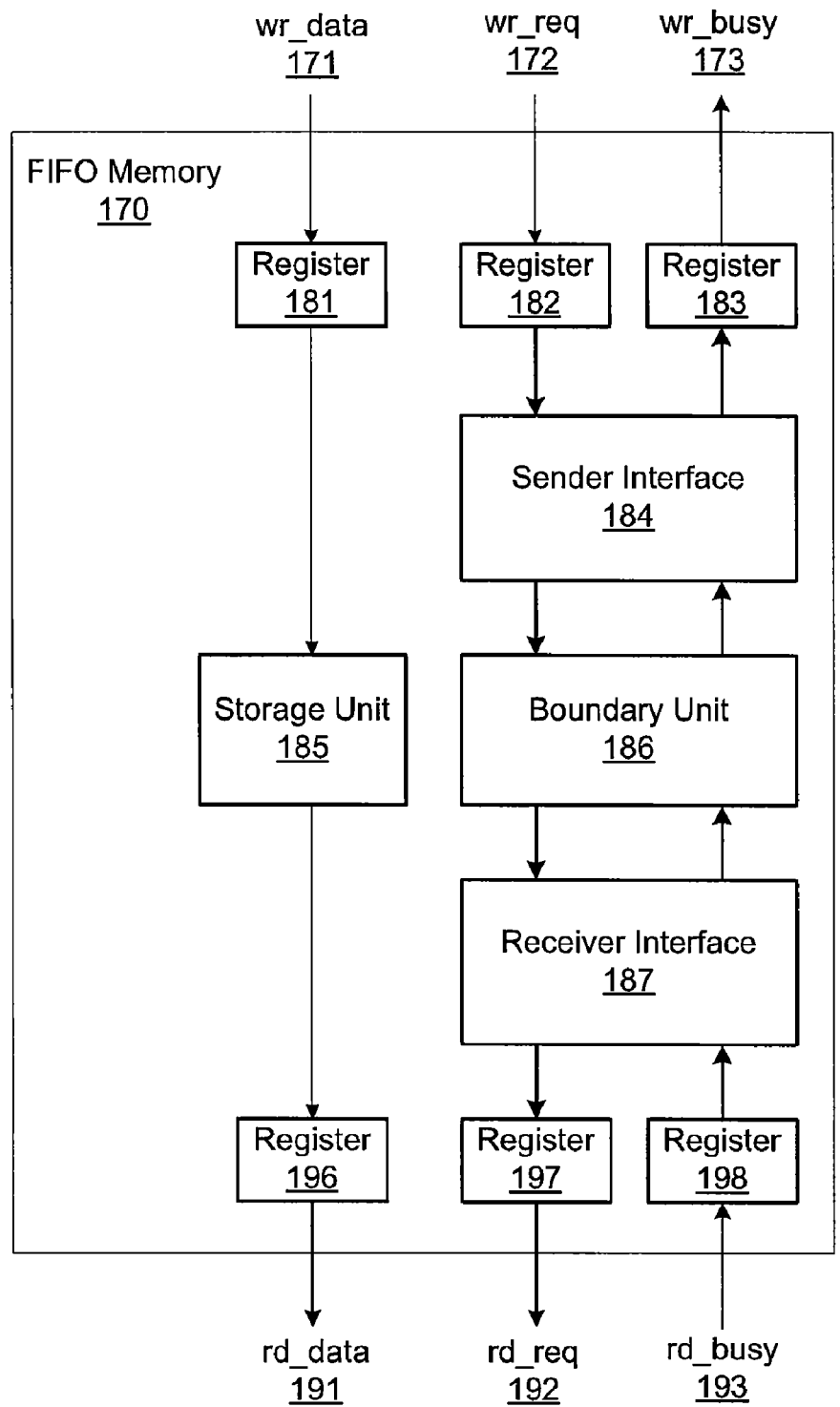
FIG. 1H illustrates a block diagram of a synthesized FIFO memory in accordance with one or more aspects of the present invention.

FIG. 1H illustrates a block diagram of a synthesized FIFO memory 170 that may be produced using generated synthesizable code 107, in accordance with one or more aspects of the present invention. A sender interface 184 includes a request/busy interface with a request signal, wr_req 172 and a busy signal, wr_busy 173. The sender data is provided by wr_data 171. Sender interface 184 outputs write control signals to a storage unit 185 and a receiver interface 187 outputs read control signals to storage unit 185. A boundary unit 186 may be used to transfer signals between a sender clock domain and a receiver clock domain. The asynchronous option may be specified to cause generator 103 to produce synthesizable code for boundary unit 186. Receiver interface includes a request/busy interface with a request signal, rd_req 192 and a busy signal, rd_busy 193. The receiver data is provided by rd_data 191. Registers 181, 182, and 183 may be synthesized to register the inputs to improve timing by using the better timing option for generator 103. Likewise, registers 196, 197, and 198 may be synthesized to register the outputs to improve timing.

The following command line may be used to produce synthesized FIFO memory 170:

FIFOGEN -m my_fifo -d my_fifo_depth -w my_fifo_width -ram ra2 -async -wr_reg -rd_reg My_fifo specifies the module name for synthesized FIFO memory 170. My_fifo_depth specifies the depth of storage unit 185 and my_fifo_width specifies the width of storage unit 185. Ra2 specifies that storage unit 185 the storage device, e.g., flip flop, RAM, latches, or the like, selected during synthesis is based on criterion provided to storage code 117, e.g., minimal die area, maximum speed, or the like. The async input specifies that generator 103 should produce synthesizable code for boundary unit 186. The -wr_reg input specifies that generator 103 should produce synthesizable code for registers on one or more of the write interface ports, e.g., registers 181, 182, and 183. The -rd_reg input specifies that generator 103 should produce synthesizable code for registers on one or more of the read interface ports, e.g., registers 196, 197, and 198. A -wr_spec input may be used to specify that generator 103 should produce synthesizable code for a speculative write capability as part of sender interface 184. A -rd_rollback input may be used to specify that generator 103 should produce synthesizable code for a speculative read capability as part of receiver interface 187.

Generator 103 may be used to produce synthesizable code for a multi-threaded FIFO memory. Instead of using a separate FIFO memory to store data for each thread, a single FIFO memory is produced to store data for multiple threads. The FIFO memory is shared between the threads to conserve die area, however each thread may be executed independently, as if each thread has a dedicated FIFO memory. A multi-threaded FIFO memory including the single FIFO memory may be used to perform real-time processing for one or more threads, but specifying those threads as having a higher priority for accessing the multi-threaded FIFO. The multi-threaded FIFO memory may also be used to sort out of order data. For example, each DRAM (dynamic random access memory) page may be assigned a different thread identifier and the data for each page may be popped from the single FIFO memory to reduce any latency incurred accessing the DRAM. In other circumstances the multi-threaded FIFO memory may be used to avoid deadlock conditions in a processing pipeline.

Figure 2A:
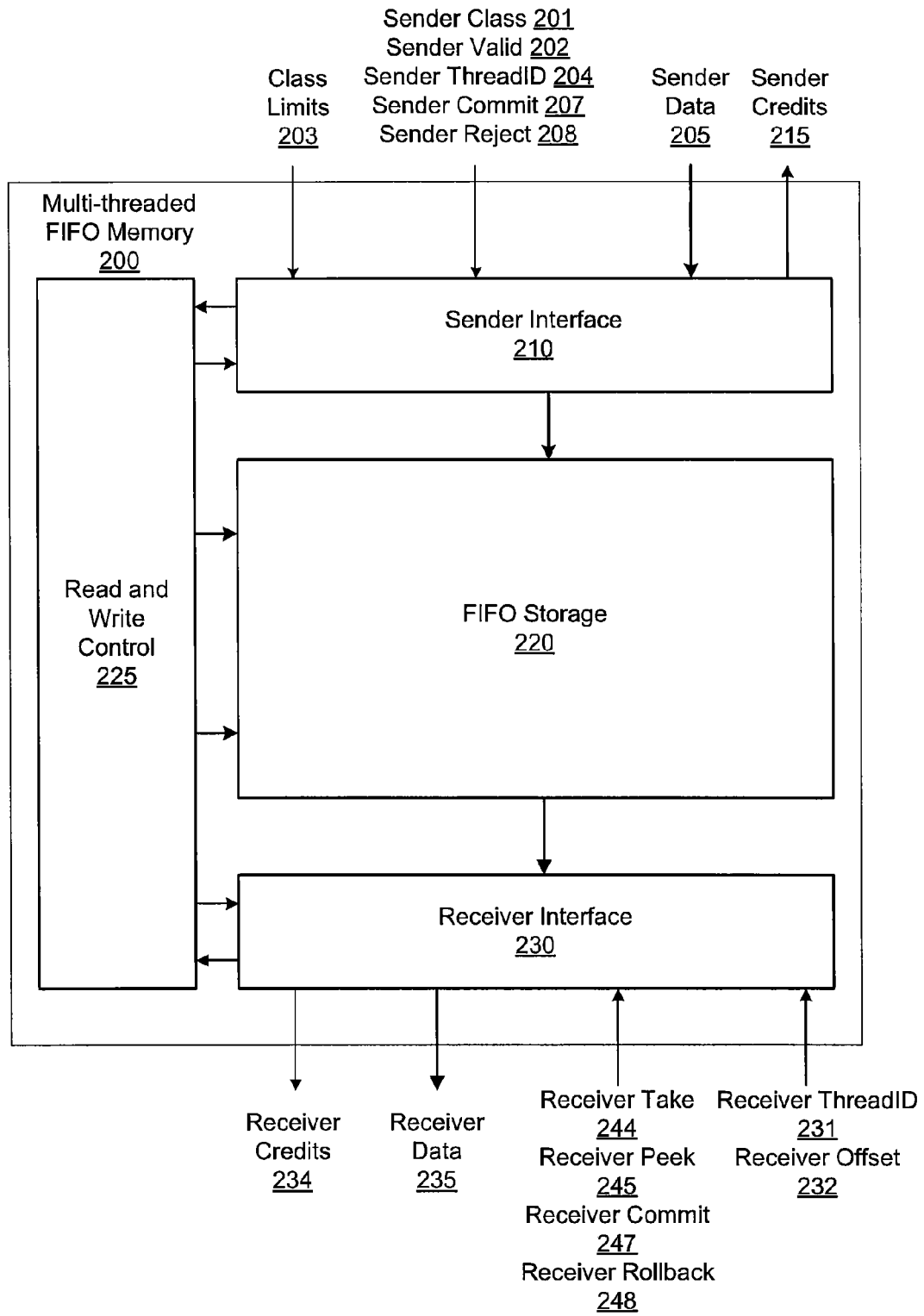
FIG. 2A illustrates a block diagram of a multi-threaded FIFO memory in accordance with one or more aspects of the present invention.

FIG. 2A illustrates a block diagram of a multi-threaded FIFO memory 200, in accordance with one or more aspects of the present invention. Multi-threaded FIFO memory 200 includes a sender interface 210, a read and write control 225, a FIFO storage 220, and a receiver interface 230. FIFO storage 220 may include flip flops, random access memory, or the like. Sender interface 210 issues sender credits via sender credits 215 and receives thread data from a sender via sender data 205 for storage in FIFO storage 220. Sender data may be received and stored for each sender credit that has been issued via sender credits 215. Sender credits 215 include a bit for each dedicated class and for the shared class. A dedicated class is allocated a number of entries in FIFO storage 220 that may only be used to store data for threads included in the dedicated class. A shared class is allocated a number of entries that may be used to store data for any thread. All threads are implicitly in the shared class.

The number of entries allocated to each class is specified by class limits 203. Class limits 203 may be changed for one or more classes while data is stored in FIFO storage 220. Programmable limits for each class may be specified using program instructions at the application level. Default limit values may be provided or values may be determined and programmed by a device driver during multi-threaded processing. In other embodiments of the present invention, the limit values may be hardwired. The combination of the number of credits issued for a class and the number of entries storing thread data included in the class should not exceed the credit limit defined for the class.

In addition to sender data 205, a sender also provides a shared class debit flag via sender debit shared 201, a threadID via sender threadID 204 and a valid signal via sender valid 202. The sender indicates that a shared class credit is used for sender data by asserting debit shared 201. When a dedicated class credit is used for sender data, debit shared 201 is negated. Each thread has a unique thread identifier, threadID. Threads are assigned to classes, with each class including one or more threads. The valid signal is asserted by the sender when sender data is provided for storage. For each clock cycle that a bit of sender credits 215 is asserted, the valid signal may be asserted to provide data and "use" a sender credit. Issuing sender credits ensures that the sender does not provide more data than can be stored in FIFO storage 220. Therefore, sender interface 210 must accept the data provided by the sender when the valid signal is asserted.

This protocol is particularly well-suited to transfer data between a sender and a multi-threaded FIFO memory 200 that are not adjacent on a die and may have one or more retiming flip-flops inserted between their connections to meet timing constraints, such as long haul signals. In other embodiments of the present invention, sender credits 215 may be replaced with a signal indicating whether or not data may be accepted during the current clock cycle.

Sender interface 210 outputs data for storage in FIFO storage 220 and outputs the threadID corresponding to the data and a push signal to read and write control 225. The push signal is asserted whenever sender commit 207 is asserted in order to advance the reject pointer. A base address that points to the next entry in FIFO storage 220 that is available for writing is updated whenever sender valid 202 is asserted. Sender interface 210 determines the number of sender credits output for each class based on the limit values, as described in conjunction with FIG. 3A.

Sender interface 210 receives a pop signal and threadID from read and write control 225 when data corresponding to the threadID is popped from FIFO storage 220, i.e., when receiver commit 247 is asserted. A rollover pointer is advanced whenever receiver commit 247 is asserted. A base address that points to the oldest entry in FIFO storage 220 for reading is updated whenever receiver take 244 is asserted. Read and write control 225 generates read and write requests, including addresses (pointers to entries in FIFO storage 220), for output to FIFO storage 220, as described in conjunction with FIGS. 6A, 6B, 6C, and 6D. When the reject and rollback features are used, the addresses include base addresses for writing the next available entry and reading the oldest entry, as well as a rollback pointer and a reject pointer.

Read and write control 225 outputs the threadID corresponding to the data provided to FIFO storage 220 by sender interface 210 and a push signal to receiver interface 230. Receiver interface 230 uses the threadID and push signal to generate receiver credits 224. For each assertion of the push signal, a bit of receiver credit corresponding to the threadID is asserted, indicating that data for the threadID is available in FIFO storage 220 and may be read and/or popped. When a take request is presented via receiver take 244, data for the thread corresponding to receiver threadID 231 is output to receiver data 235. Note that data is not removed from FIFO storage 220 when receiver take 244 is asserted, unless the rollback capability is not available in multi-threaded FIFO memory 200. When the rollback capability is available in multi-threaded FIFO memory 200, receiver take 244 does not remove the data from FIFO storage 220. In order to remove the data from FIFO storage 220 receiver commit 246 must also be asserted either simultaneously with receiver take 244 or at a later time. Receiver interface 230 outputs a pop signal (corresponding to the take or commit request), receiver rollback 248, receiver threadID 231, receiver offset 232, and a receiver peek 245 signal to read and write control 225.

A peek request is presented via receiver peek 245 and is used to read data from FIFO storage 220 without removing (popping) the data from FIFO storage 220. After data is read by for a peek request, the data may be popped (read and removed from FIFO storage 220) by a take request (when the rollback capability is not available) or by a receiver commit request. Receiver offset 232 is used to read data stored in an entry of a FIFO for a thread that is offset from the head of the FIFO. Rather than reading data at the top of the FIFO, i.e., the oldest data in the FIFO, data from other positions in the FIFO may be read by specifying a non-zero offset for receiver offset 232. Receiver offset 232 is independent of receiver rollback 248 and receiver commit 247. Therefore, entries in FIFO storage 220 are freed in FIFO order by receiver commit 247. Receiver rollback 248 is used to set the base address that points to the oldest data to the rollback pointer in order to output one or more entries again using receiver take 244.

Multi-threaded FIFO memory 200 also receives a reset signal and at least one clock signal. In some embodiments of the present invention, multi-threaded FIFO memory 200 is asynchronous and a first clock is provided by a sender to sender interface 210 and a second clock is provided by a receiver to receiver interface 230. When multiple receivers read data stored in multi-threaded FIFO memory 200, an arbiter may be coupled between the multiple receivers and multi-threaded FIFO memory 200. Likewise, when multiple senders provide data to multi-threaded FIFO memory 200, an arbiter may be coupled between the multiple senders and multi-threaded FIFO memory 200.

The following command line may be used to produce synthesized multi-threaded FIFO memory 200:

FIFOGEN -m my_fifo -d my_fifo_depth -w my_fifo_width -ram ra2 -threads N -wr_credit -wr_immediate_credits -rd_take -rd_take_offset -rd_take partial -rd_rollback -wr_spec My_fifo specifies the module name for synthesized multi-threaded FIFO memory 200. My_fifo_depth specifies the depth of FIFO storage 220 and my_fifo_width specifies the width of FIFO storage 220. Ra2 specifies that the storage device, e.g., flip flop, RAM, latches, or the like, selected during synthesis is based on criterion provided to FIFO storage 220, e.g., minimal die area, maximum speed, or the like. The -threads input specifies that generator 103 should produce synthesizable code for N execution threads. The -wr_credit input specifies that generator 103 should include synthesizable code for a credit based interface in sender interface 210. The -wr_immediate_credits input specifies that generator 103 should include synthesizable code for immediate sender credits (following a reset) to be issued by sender interface 210.

The -rd_take input specifies that generator 103 should include synthesizable code for a take based interface in receiver interface 230. The -rd_take_offset and -rd_take partial inputs specify that generator 103 should include synthesizable code for the offset and peek request features, respectively, in receiver interface 230. The -wr_spec input specifies that generator 103 should include synthesizable code for a speculative write capability as part of sender interface 184 and reject pointer logic as part of read and write control 225. The -rd_rollback input specifies that generator 103 should include synthesizable code for a speculative read capability as part of receiver interface 187 rollback pointer logic as part of read and write control 225.

Figure 2B:
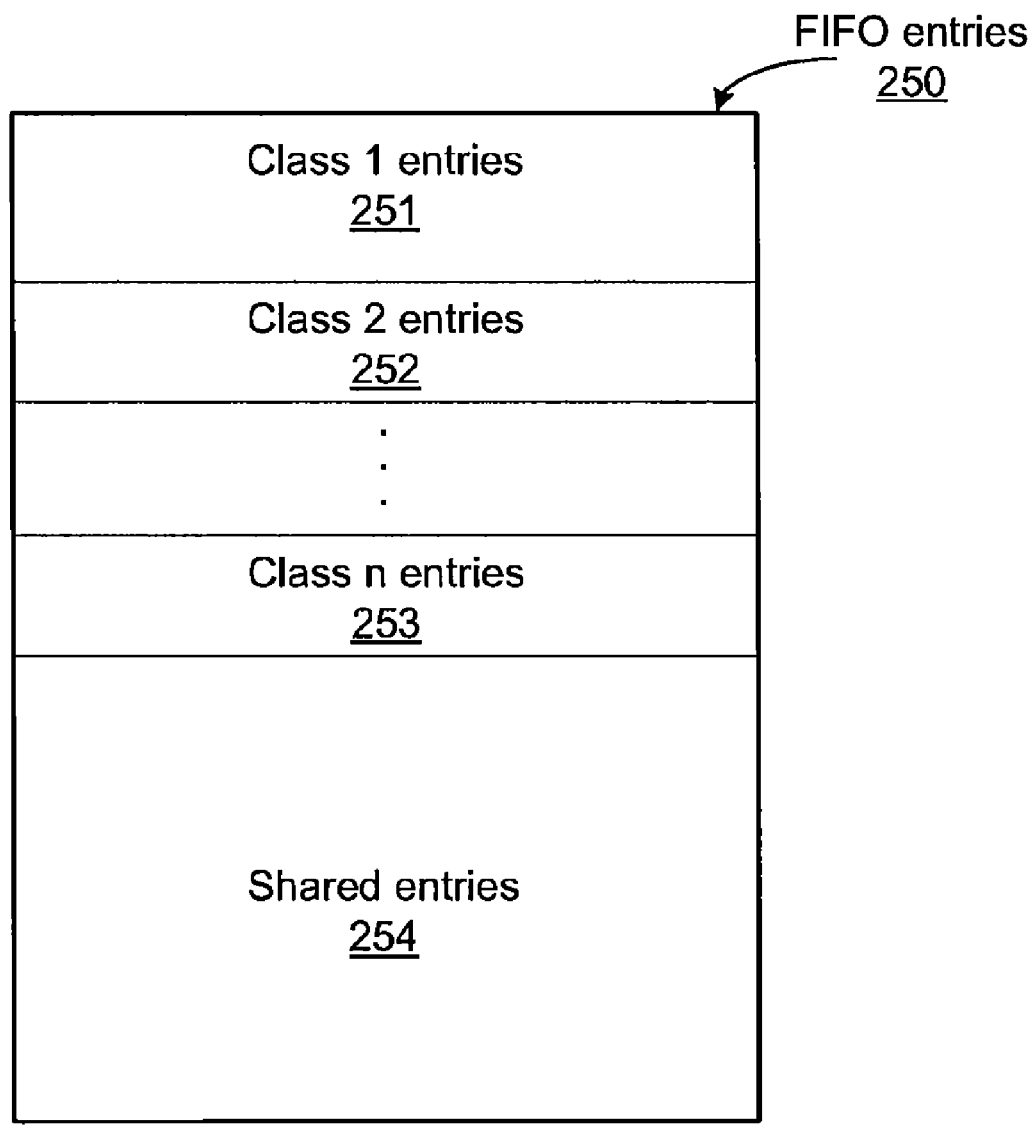
FIG. 2B illustrates a conceptual diagram of data entries in a multi-threaded FIFO memory in accordance with one or more aspects of the present invention.

FIG. 2B illustrates a conceptual diagram of data entries, FIFO entries 250, in FIFO storage 220 of multi-threaded FIFO memory 200, in accordance with one or more aspects of the present invention. In order to store data in each entry of FIFO storage 220, the number of entries allocated to the combination of the dedicated classes and shared class, i.e., the number of entries in FIFO entries 250, should be equal to the number of entries in FIFO storage 220. A limit value may be specified for each of class 1 entries 251, class 2 entries 252, class n entries 253, and shared entries 254. The sum of the limit values should not exceed the number of entries in FIFO storage 220.

As previously described, each class may include one or more threads, specified by their respective threadIDs. For example, class 1 entries 251 may be configured to store data for threadID 1 and threadID 2. Class 2 entries 252 may be configured to store data for threadID 3. Shared entries 252 may be configured to store data for threadID 4. Because shared entries 252 is a shared class, shared entries 252 may also store data for threadID 1, threadID 2, and threadID 3.

Figure 3A:
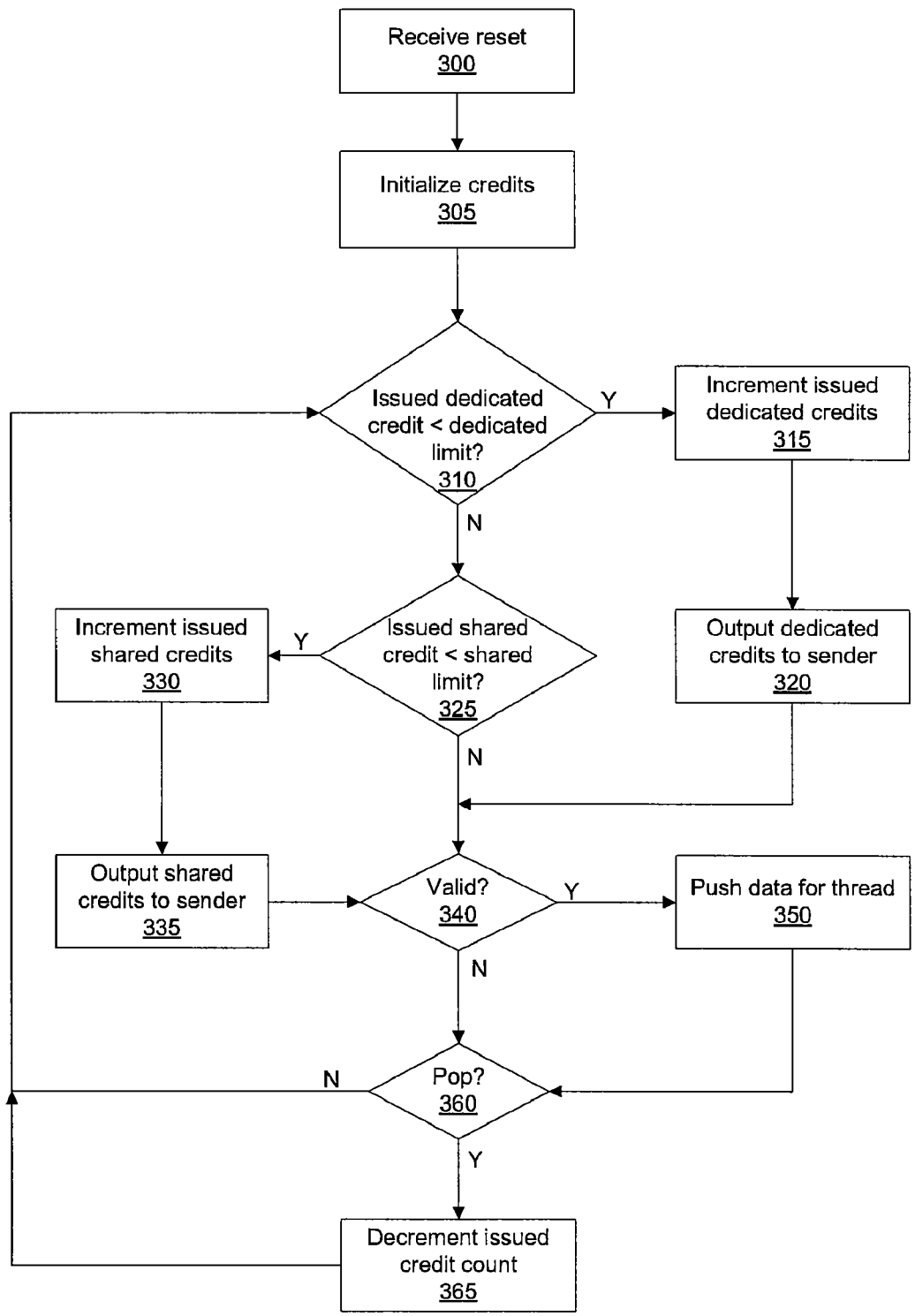
FIG. 3A illustrates a flow diagram of an exemplary method of tracking the status of entries in the multi-threaded FIFO memory of FIG. 2A in accordance with one or more aspects of the present invention.

FIG. 3A illustrates a flow diagram of an exemplary method of tracking the status of entries in FIFO storage 220, in accordance with one or more aspects of the present invention. In step 300 multi-threaded FIFO memory 200 receives a reset signal. In step 305 sender interface 210 initializes sender credits by issuing a predetermined number of credits for each class via sender credits 215. In one embodiment of the present invention, sender interface 210 issues one credit for each class. Therefore, a sender may begin providing data to multi-threaded FIFO memory 200 following reset and without waiting to receive a credit. This may improve the data processing throughput of a system including multi-threaded FIFO memory 200.

Sender interface 210 maintains a count of issued credits for each class, referred to as issued dedicated credit counts and an issued shared credit count. The issued credit counts are updated to indicate the number of credits issued for each class in step 305. In some embodiments of the present invention, sender interface 210 may also maintain a count of credits for which data is stored in FIFO storage 220, referred to as occupied dedicated credit counts and occupied shared credit count.

In those embodiments, a total dedicated credit count can be computed for a dedicated class by summing the occupied dedicated credit count and issued dedicated credit count for the dedicated class. Similarly, a total shared credit count can be computed for the shared class by summing the occupied shared credit count and issued shared credit count for the shared class. The total dedicated credit count for a dedicated class should not exceed the limit value for the dedicated class. Likewise, the total shared credit count for the shared class should not exceed the limit value for the shared class. In other embodiments of the present invention, the issued dedicated credit counts and issued shared credit count include the issued credits and the occupied credits and the issued credit counts are equal to the total credit counts.

In step 305 sender interface 210 may also receive limit values for each class via class limits 203 and store the limit values in registers. The limit values define the maximum number of dedicated credits available for each dedicated class and the maximum number of shared credits available for the shared class.

In step 310 sender interface 210 determines if the number of dedicated credits issued for any class is less than the maximum number of dedicated credits, i.e., dedicated limit, for the class. If, in step 310 sender interface 210 determines that one or more classes have dedicated credits that may be issued, in step 315 sender interface 210 increments the issued dedicated credit count for each of the one or more classes. Each issued dedicated credit count may be incremented by one or more depending on the number of sender credits that will be issued to the class. In some embodiments of the present invention, each issued dedicated credit count is incremented once per clock cycle. In other embodiments of the present invention, multiple credits may be issued in a single clock cycle and each issued dedicated credit count may be updated accordingly in a single clock cycle. In step 320 sender interface 210 issues sender credits to each of the one or more classes. Sender interface 210 may issue one sender credit to each of the one or more classes or sender interface 210 may issue more than one sender credit to each of the one or more classes.

If, in step 310 sender interface 210 determines that all of the classes have issued dedicated credit counts equal to their respective limit values, then in step 325 sender interface 210 determines if the number of shared credits issued for any class (issued shared credit count) is less than the maximum number of shared credits. If, in step 325 sender interface 210 determines that shared credits are available for issue, then in step 330 sender interface 210 increments the issued shared credit count for the shared credit class. The issued shared credit count may be incremented by one or more depending on the number of shared credits that will be issued. In step 335 sender interface 210 issues shared credits to the shared class. Sender interface 210 may issue one shared credit or sender interface 210 may issue more than one shared credit.

In step 340 sender interface 210 determines if the sender valid signal is asserted, i.e., the sender is providing data to multi-threaded FIFO memory for storage. If, in step 340 the sender valid signal is not asserted, then sender interface 210 proceeds directly to step 360. If, in step 340 the sender valid signal is asserted, then in step 350 sender interface 210 asserts a push signal to read and write control 225 and outputs sender data 205 to FIFO storage 220. Sender interface 210 also outputs the sender threadID and the shared class debit flag to read and write control 225. A more detailed description of step 350 is provided in conjunction with FIG. 6A.

In step 360 sender interface 210 determines if a pop signal is received from read and write control 225, and, if not, sender interface 210 returns to step 310 to determine if more credits may be issued. Otherwise, in step 365 sender interface 210 decrements the issued credit count corresponding to the data that was popped from FIFO storage 220. After completing step 365, sender interface 210 returns to step 310 to determine if more credits may be issued. In other embodiments of the present invention, additional limit values, thresholds, and the like may be used to control the output of sender credits to a sender. Furthermore, varying techniques of allocating the shared credits between different dedicated classes may be used by the sender. For example, a priority may be specified for each class and the allocation of shared credits may be influenced by the priority of each class. When sender reject 208 is asserted the sender restores the credits associated with entries that are removed from FIFO storage 220. Therefore, sender interface 210 only outputs credits once and does not issue credits for rejected entries.

Figure 3B:
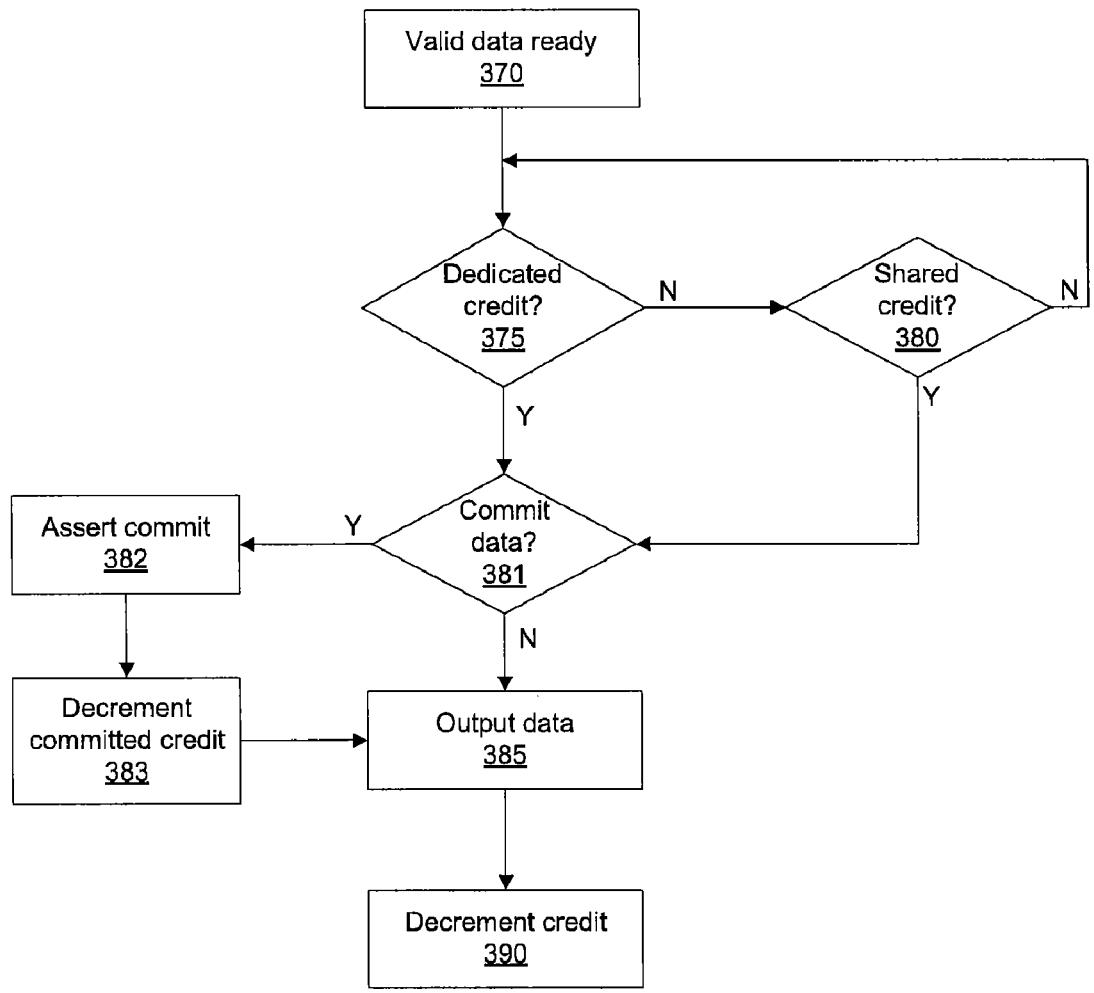
FIG. 3B illustrates a flow diagram of an exemplary method of providing data for storage in the multi-threaded FIFO memory of FIG. 2A in accordance with one or more aspects of the present invention.

FIG. 3B illustrates a flow diagram of an exemplary method of providing data for storage in FIFO storage 220, in accordance with one or more aspects of the present invention. The method steps shown in FIG. 3B may be performed by a sender providing data for storage in FIFO storage 220. In step 370 the sender determines that valid data is ready for output to multi-threaded FIFO memory 200. In step 375, the sender determines if a dedicated credit is available based on the class that includes the threadID and class of the dedicated credit. The sender maintains a count of dedicated credits received from sender interface 210 for each class. As previously described, the sender maintains a count of the committed credits for each class and the shared credits that have been committed in order to restore credits when the sender asserts sender reject 208. The sender also maintains a mapping of threadIDs to classes in order to determine whether an available credit may be used to send data for a particular threadID.

If, in step 375 the sender determines that a dedicated credit is available, then sender interface proceeds directly to step 381. Otherwise, in step 380 the sender determines if a shared credit is available, and, if not, the sender returns to step 375 and waits for a dedicated or shared credit to be issued. In step 381, the sender determines if the valid data should be committed to FIFO storage 220. Committed data cannot be removed from FIFO storage 220 by the sender, whereas uncommitted data can be removed by the send using sender reject 208. If, in step 381 the sender determines that the valid data should not be committed, then the sender proceeds directly to step 385.

Otherwise, in step 382 the sender asserts send commit 208 for the valid data. In step 383 the sender decrements a committed credit count and proceeds to step 385. The credit may be a dedicated or shared class credit and the sender may maintain information to restore the dedicated and shared class credits separately when the reject capability is used.

In step 385 the sender outputs data to multi-threaded FIFO memory 200 via sender data 205, for storage in FIFO storage 220. The sender also outputs the shared class debit flag, the sender valid signal, and the sender threadID, to sender interface 210. In step 390 the sender decrements the credit count, shared or dedicated, corresponding to the class that was output in step 385. In some embodiments of the present invention, the sender may use shared credits before using dedicated credits. In other embodiments of the present invention, the sender may rely on threadID or class priorities in determining whether to use a shared or dedicated credit to output data for a thread. In still other embodiments of the present invention, the sender may accumulate several sender credits and send data for a particular threadID over several consecutive cycles, i.e., a burst.

Figure 3C:
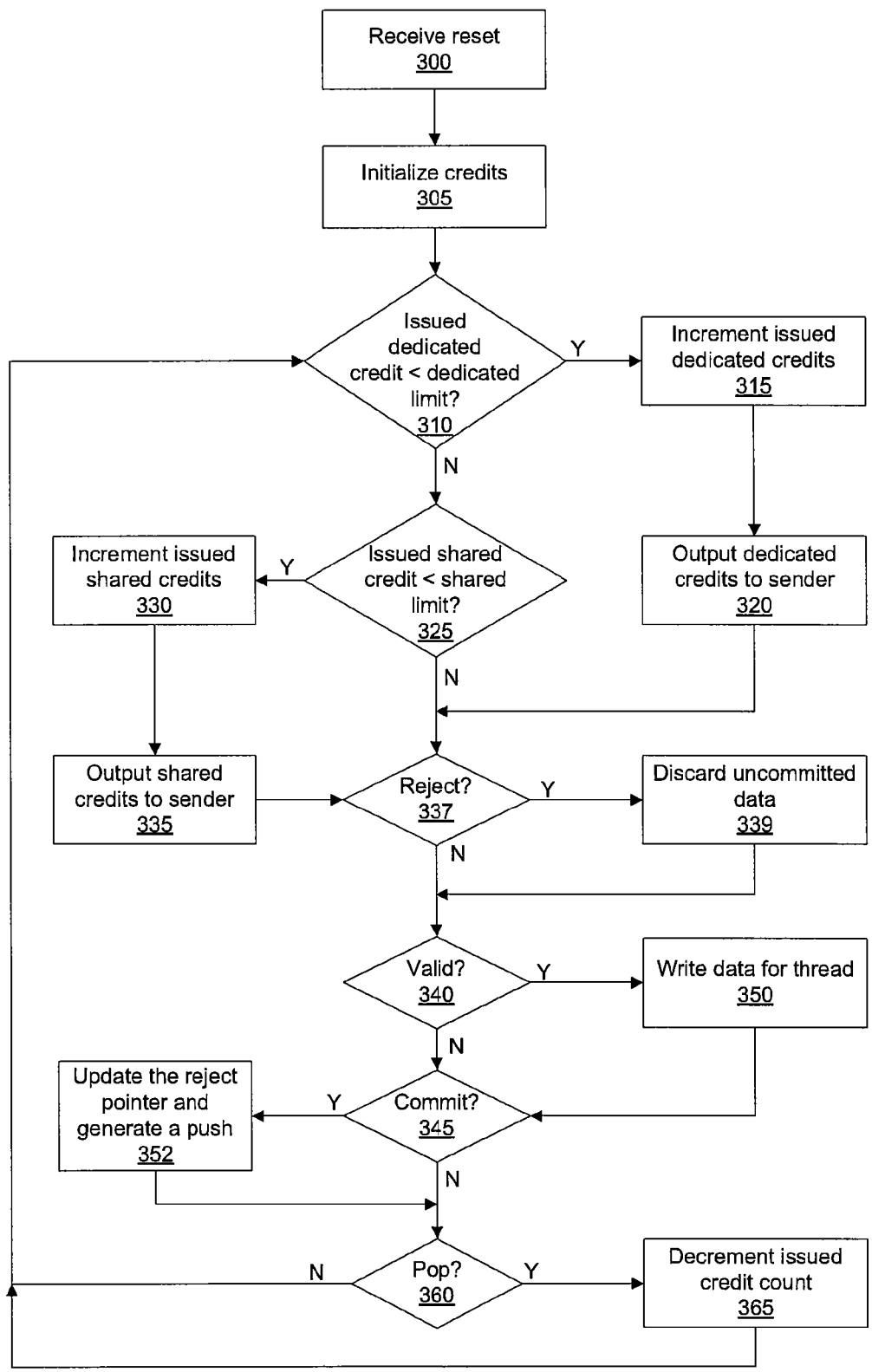
FIG. 3C illustrates a flow diagram of an exemplary method of tracking the status of entries in the multi-threaded FIFO memory of FIG. 2A that includes speculative read and write capability in accordance with one or more aspects of the present invention.

FIG. 3C illustrates a flow diagram of an exemplary method of tracking the status of entries in a multi-threaded FIFO memory 220 of FIG. 2A that includes speculative read and write capability, in accordance with one or more aspects of the present invention. The method includes steps 300, 305, 310, 315, 320, 325, 330, and 335 of FIG. 3A. Those steps are completed as previously described. In step 337 sender interface 210 determines if sender reject 208 is asserted, and, if not, sender interface 210 proceeds directly to step 340. Otherwise, in step 339 sender interface 210 discards the uncommitted data for the thread ID specified by sender threadID 204, and proceeds to step 340. The uncommitted data for the thread ID is discarded by setting the write pointer to the reject pointer.

In step 340 sender interface 210 determines if the sender valid signal is asserted, and, if it is not, then sender interface 210 proceeds directly to step 360. If, in step 340 the sender valid signal is asserted, then in step 350 sender interface 210 asserts a push signal to read and write control 225 and outputs sender data 205 to FIFO storage 220. In step 345 sender interface 210 determines if sender commit 207 is asserted, and, if not, sender interface 210 proceeds directly to step 360. Otherwise, in step 352 sender interface 210 outputs sender commit 207 to read and write control 225 and generates a push output to read and write control 225 before proceeding to step 360. Read and write control 225 increments the reject pointer. The push is then output to receiver interface 230 in order to update the available credits for the thread ID specified by sender threadID 204. Steps 360 and 365 are completed as described in conjunction with FIG. 3A.

Figure 4A:
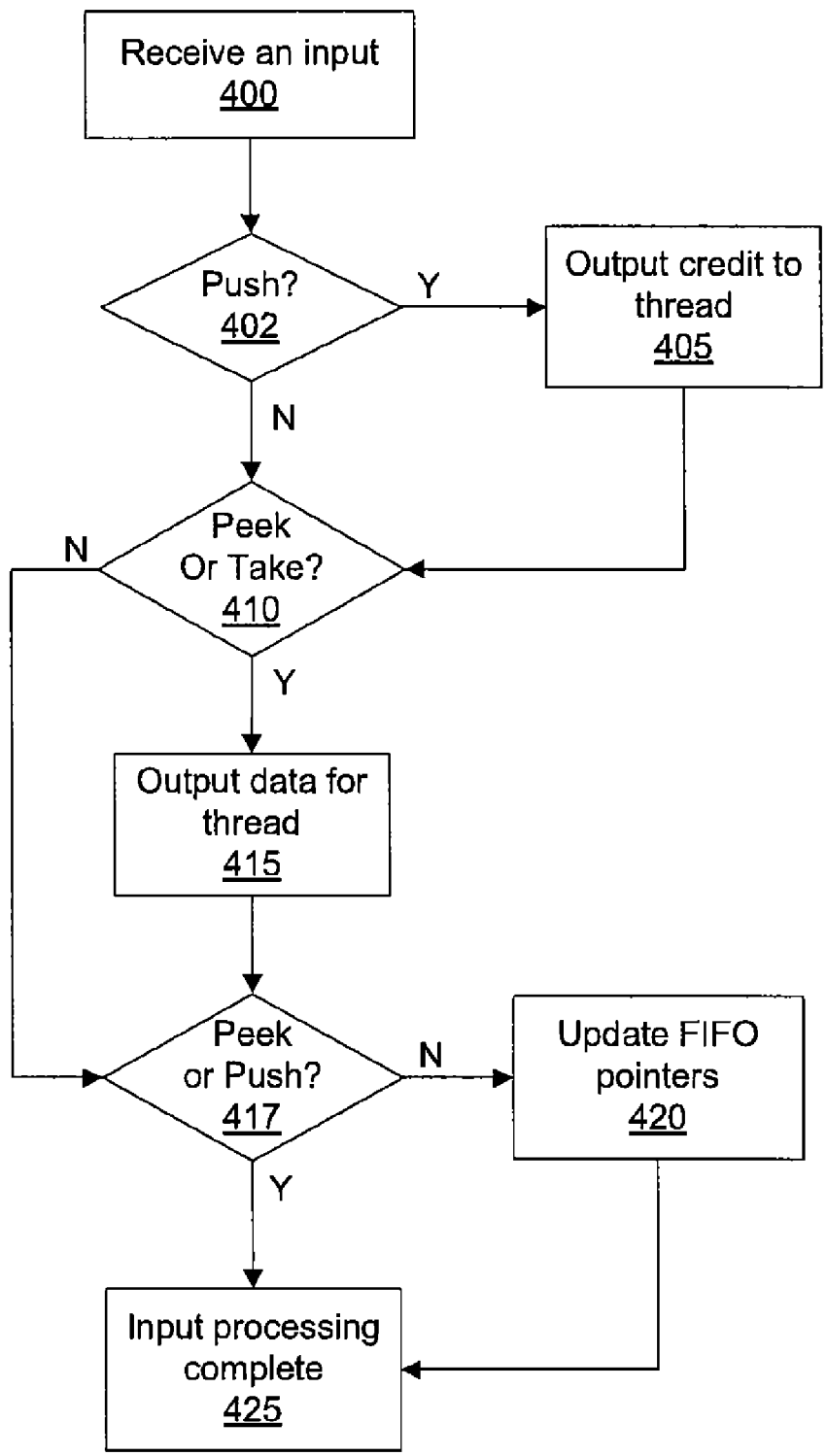
FIG. 4A illustrates a flow diagram of an exemplary method of performing the functions of the receiver interface of FIG. 2A in accordance with one or more aspects of the present invention.

FIG. 4A illustrates a flow diagram of an exemplary method of performing the functions of the receiver interface 230 of FIG. 2A when multi-threaded FIFO memory 200 is configured for speculative read capability, in accordance with one or more aspects of the present invention. In step 402 receiver interface 230 receives an input, i.e., one or more of the following is asserted, receiver take 244, receiver peek 245, receiver commit 247, receiver rollback 248. In step 402 receiver interface 230 determines if a push is received from read and write control 225, and, if not, receiver interface 230 proceeds directly to step 410. If, in step 400 receiver interface 230 determines that a push is received, then in step 405 receiver interface 230 outputs a receiver credit for the threadID. In addition to a push signal, receiver interface 230 receives a threadID from read and write control 225. Unlike sender interface 210, receiver interface 230 issues credits for threadIDs rather than classes. Therefore, receiver interface 230 does not rely on the class to threadID mapping.

In step 410 receiver interface 230 determines if a peek or take request is received from a receiver, and, if not, receiver interface 230 proceeds directly to step 417. A take request is received when receiver take 244 is asserted and a peek request is received when receiver peek 245 is asserted. The take request indicates that the receiver wants data that corresponds to the receiver threadID provided via receiver threadID 231 to be output via receiver data 235. The peek request indicates that the receiver wants data from an entry specified by receiver offset 232 that corresponds to the receiver threadID provided via receiver threadID 231 to be output via receiver data 235. When data is output using a take or peek request, the data is retained in FIFO storage 220, i.e., the rollback pointer is not incremented. If, in step 410 receiver interface 230 determines that a peek or take request is received, then in step 415 receiver interface 230 reads data for the thread corresponding to the threadID and outputs the data. A more detailed description of step 415 is provided in conjunction with FIG. 6C.

When an offset specified via receiver offset 232 is zero, the data is read from FIFO storage 220 in FIFO order using the read pointer, i.e., the data that was written first is read first for each thread. When the offset is not zero, the data is read from FIFO storage 220 based on the offset. The offset corresponds to the entry in the FIFO for a thread, where an offset of zero indicates the head of the FIFO (first-in entry) and an offset of n, where n is the size of the FIFO indicates the tail of the FIFO (last-in entry).

In step 417 receiver interface 230 determines if a peek request is received from a receiver or if a push is received from read and write control 225, and, if so, receiver interface 230 proceeds directly to step 425. If a peek request or push was not received, then the input received in step 400 may be a take or rollback request, in which case receiver interface 230 proceeds to step 420 to update the read and/or rollback pointers, as described in conjunction with FIG. 6D. In step 425 the input processing is complete.

Figure 4B:
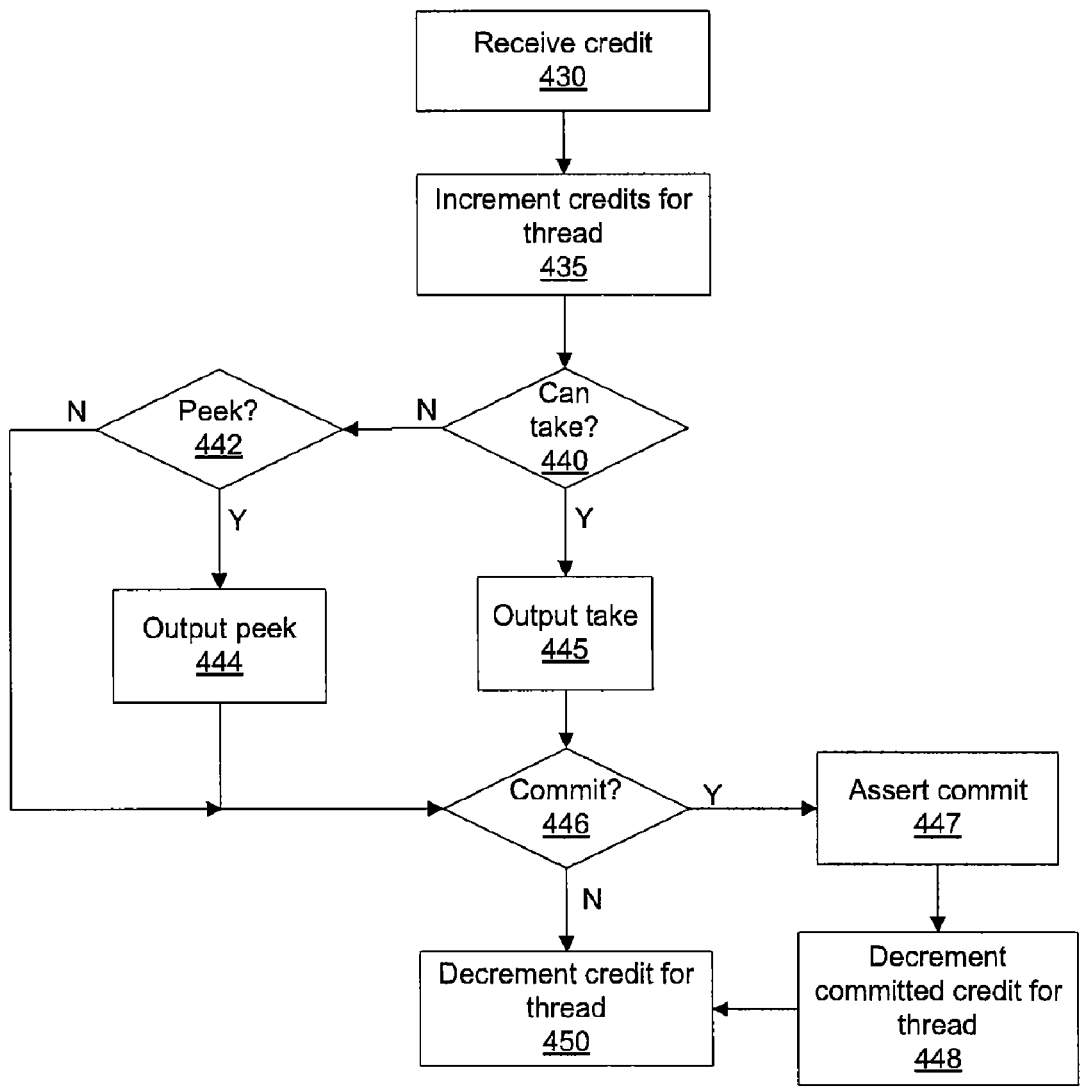
FIG. 4B illustrates a flow diagram of an exemplary method of obtaining data from the multi-threaded FIFO memory of FIG. 2A in accordance with one or more aspects of the present invention.

FIG. 4B illustrates a flow diagram of an exemplary method of obtaining data from multi-threaded FIFO memory 200 of FIG. 2A, in accordance with one or more aspects of the present invention. In step 430 a receiver receives one or more receiver credits from receiver interface 230 via receiver credits 234. Receiver interface 230 asserts a bit of receiver credits 234 that corresponds to a particular threadID to issue a receiver credit for that particular threadID. The receiver maintains a count of available receiver credits for each threadID, accounting for receiver credits that are restored when a rollback is requested. In step 435 the receiver increments an available receiver credit count corresponding to the threadID indicated by receiver credits 234. In some embodiments of the present invention, more than one receiver credit may be issued in a cycle and one or more available receiver credit counts are updated accordingly in step 435.

In step 440 the receiver determines if data may be accepted from multi-threaded FIFO memory 200 for any thread with an available receiver credit count greater than zero. If, in step 440 the receiver determines that data should be read for any thread using a take request, then in step 445 the receiver outputs a take request to multi-threaded FIFO memory 200 and outputs the thread ID for the thread via receiver threadID 231 and the receiver proceeds to step 446. The receiver may also provide an offset indicating that an entry other than the head of a thread FIFO should be read.

If, in step 440 the receiver determines that data should not be read for a thread using a take request, then in step 442, the receiver determines if data should be read (peeked) from multi-threaded FIFO memory 200 for any thread with an available receiver credit count greater than zero. If, in step 442 the receiver determines that a peek should not be issued, the receiver proceeds to step 446. Otherwise, in step 444 the receiver outputs a peek request to multi-threaded FIFO memory 200 and outputs the threadID for the thread via receiver threadID 231. The receiver may also provide an offset indicating that an entry other than the head of a thread FIFO should be read. Note that a take request will cause the read pointer to increment, whereas a peek request will not cause the read pointer to change.

In step 446 the receiver determines if data read for a peek or take request (present or at an earlier time) for the threadID should be removed from multi-threaded FIFO storage 220 using a commit request, and, if not, the receiver proceeds directly to step 450. Otherwise, in step 447 the receiver asserts receiver commit 247 and in step 448 the receiver decrements a committed credit for the threadID. The receiver maintains a committed credit count in addition to an available receiver credit count for each threadID in order to properly restore credits when a rollback is requested for the threadID. In step 450 the receiver decrements the available receiver credit count for the threadID. The receiver has the flexibility to determine when to take data from multi-threaded FIFO memory 200 for any one of the threads. Therefore, each of the threads may be processed independently from the other threads. Specifically, each thread may be processed as though a separate FIFO is used to store data for each thread.

Figure 5A:
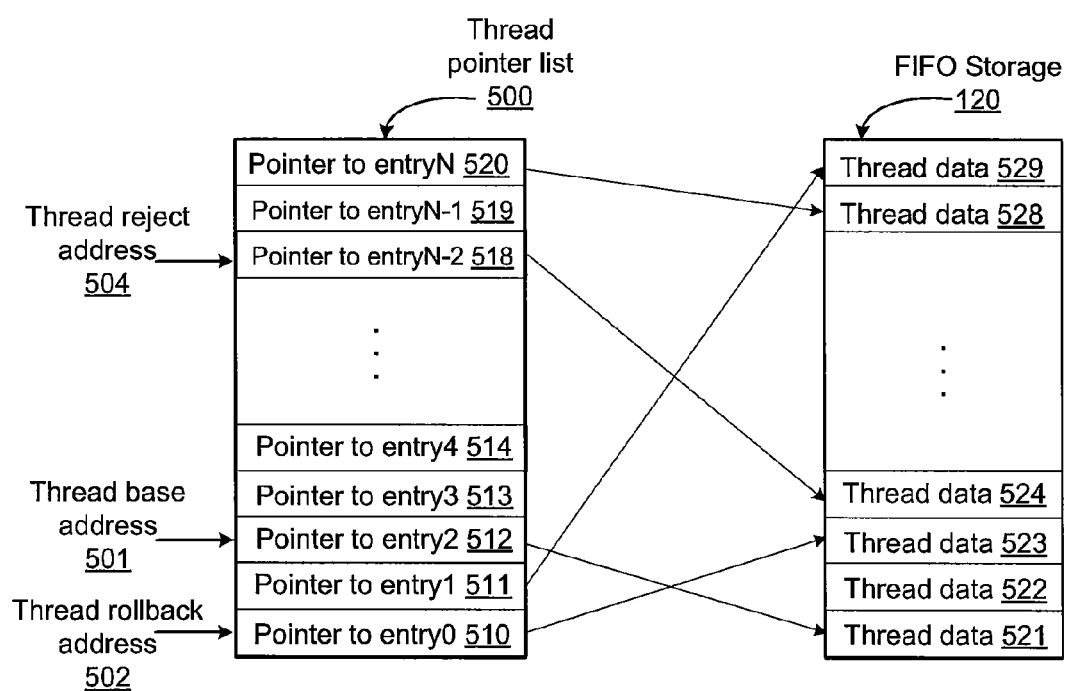
FIG. 5A illustrates a conceptual diagram of a thread pointer list and the FIFO storage in accordance with one or more aspects of the present invention.

FIG. 5A illustrates a conceptual diagram of a thread pointer list, thread pointer list 500, and FIFO storage 220 in accordance with one or more aspects of the present invention. Thread pointer list 500 is included within read and write control 225 and may include flip-flops, RAM, or the like. Thread pointer list 500 includes an entry for each entry in FIFO storage 220 that stores data for a particular thread and is used to configure FIFO storage 220 as a FIFO storing the data for the particular thread.

Because FIFO storage 220 stores data for multiple execution threads that push and pop data at different rates, each entry in FIFO storage 220 may store data for any one of the execution threads as the entry becomes available. Therefore, data for a single thread may be scattered within various locations in FIFO storage 220. To emulate a FIFO for a single thread, an ordered list of pointers for the single thread is maintained using thread pointer list 500. Thread base address 501 indicates the head of the FIFO that stores a pointer to the entry that should be read by a take request, i.e., thread base address 501 is the read pointer. As shown in FIG. 5A, thread base address 501 points to an entry in thread pointer list 500 that stores a pointer to entry2 512. Pointer to entry2 512 points to an entry in FIFO storage 120 that contains thread data 521.

Thread rollback address 502 indicates the entry of the FIFO that stores a pointer to the first-in data, i.e., thread rollback address 502 is the rollback pointer. As shown in FIG. 5A, thread rollback address 502 points to an entry in thread pointer list 500 that stores a pointer to entry2 510. Pointer to entry0 510 is stored in the first entry of thread pointer list 500 and points to an entry in FIFO storage 120 that contains thread data 523. The rollback pointer is incremented for each receiver commit request and the read pointer is incremented for each receiver take request. The read pointer is set to point to the same entry as the rollback pointer when a receiver rollback request is received in order to replay output of any "taken" entries that have not been committed.

Thread reject address 504 indicates the entry of the FIFO that stores a pointer to the last (newest) data that has been committed, i.e., thread reject address 504 is the reject pointer. As shown in FIG. 5A, thread reject address 504 points to an entry in thread pointer list 500 that stores a pointer to entryN−2 518. Pointer to entryN−2 518 is stored in the N−2 entry of thread pointer list 500 and points to an entry in FIFO storage 120 that contains thread data 524. The reject pointer is incremented for each sender commit request. When each sender valid data write is committed, thread reject address 504 will point to pointer to entryN 520. The entries in thread pointer list 500 that are "newer" than thread reject address 504, e.g., pointer to entry N−1 519 and pointer to entry N 520, are discarded when a sender reject request is received in order to prevent reading by the receiver of any written entries that have not been committed by the sender.

The second entry in the FIFO, thread data 529, is stored at the entry in FIFO storage 220 corresponding to pointer to entry1 511. Pointer to entry1 511 is stored in the second entry of thread pointer list 500, the entry offset by 1 from thread rollback address 502. The pointers stored in thread pointer list 500 are stored in FIFO order, the order in which data stored in the entry of FIFO storage 220 corresponding to the pointers was stored. For example, a third entry in the FIFO, the entry offset by 2 from thread rollback address 502, stores pointer to entry2 512 that corresponds to the entry in FIFO storage 220 that stores thread data 521. The tail of the FIFO stores pointer to entryN 520, the entry offset by N from thread rollback address 502, where N is the number of occupied entries in the FIFO. Pointer to entryN 520 corresponds to the entry in FIFO storage 220 that stores thread data 528. Thread data 522 may be thread data for another thread or thread data that may be overwritten because a pointer corresponding to the entry storing thread data 522 is not stored in thread pointer list 500 or another thread pointer list.

As thread data is read from FIFO storage 220 using a take request, thread base address 501 is updated to point to the entry storing pointer to entry3 513, the entry storing pointer to entry4 514, and so forth. As thread data is popped from FIFO storage 220, thread rollback address 502 is updated to point to the entry storing pointer to entry1 511, the entry storing pointer to entry2 512, and so forth. Alternatively, each pointer may be copied, i.e., shifted, to the adjacent entry in thread pointer list 500. For example, when pointer to entry0 510 is popped, pointer to entry1 511 may be copied to the entry corresponding to thread rollback address 502 and pointer to entry2 512 may be copied to the entry at an offset of 2. Shifting the pointers in thread pointer list 500 may be more efficient than shifting the thread data stored in FIFO storage 220 since the pointers are typically fewer bits than the thread data. When data for multiple execution threads is stored in FIFO storage 220, a thread pointer list is needed for each one of the multiple execution threads, as shown in FIG. 5B.

Figure 5B:
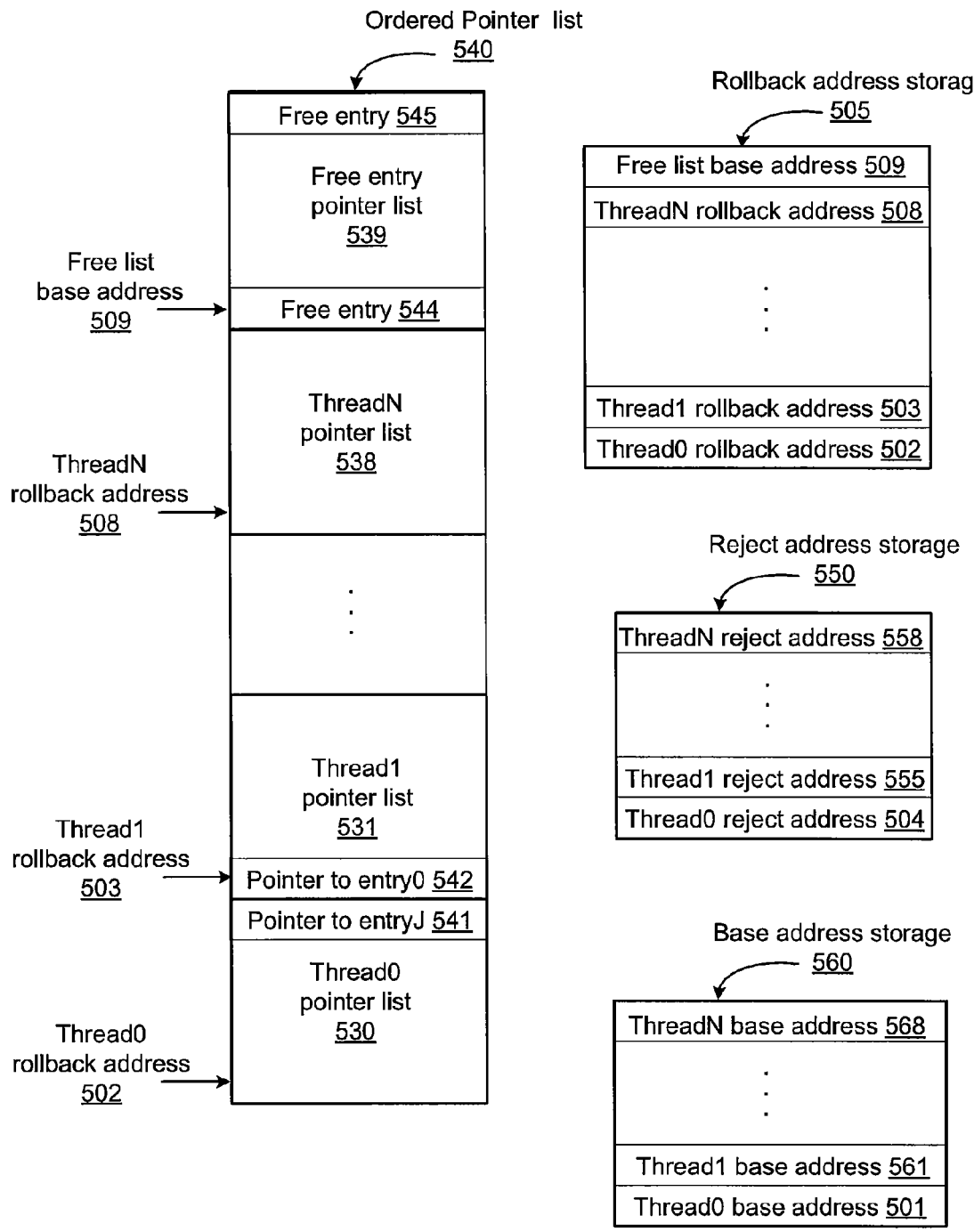
FIG. 5B illustrates a conceptual diagram of a base address storage, a reject address storage, a rollback address storage, and an ordered pointer list that includes a free entry pointer list and several thread pointer lists in accordance with one or more aspects of the present invention.

FIG. 5B illustrates a conceptual diagram of a base address storage, rollback address storage 505, and an ordered pointer list, ordered pointer list 540, that includes a free entry pointer list and several thread pointer lists, in accordance with one or more aspects of the present invention. Ordered pointer list 540 includes thread pointer lists for two or more execution threads and a free entry pointer list 539 that stores pointers to entries in FIFO storage 220 that are available to store data. Because ordered pointer list 540 includes two or more ordered pointer lists, a mechanism for locating the ordered pointer list for each thread should be provided. As previously described, a thread pointer list forms the data FIFO for an execution thread. The head of the data FIFO for a thread may be located using the rollback address for the thread. The tail of the data FIFO for the thread may be located by subtracting 1 from the rollback address of the next thread. For the last thread, the tail may be located by subtracting 1 from the base address of free entry pointer list 539, free list base address 509. In other embodiments of the present invention, addresses for the tail locations may be stored or the addresses for the tail locations may be computed using the size of each data FIFO. The size of each data FIFO is easily determined by tracking the writes, rejects, and pops for each threadID.

Rollback address storage 505 includes an entry for a thread rollback address of each one of the thread pointer lists and an entry for a base address of a free list, free list base address 509. For example, thread0 rollback address 502 is stored in a first entry of rollback address storage 505, thread1 rollback address 503 is stored in a second entry of rollback address storage 505, threadN rollback address 508 is stored in an N+1 entry of rollback address storage 505, and free list base address 509 is stored in the last entry of rollback address storage 505. A FIFO for a particular threadID is empty when the rollback address for the threadID is equal to the rollback address for the threadID+1. In embodiments of the present invention that track the head and tail of the FIFO for each thread ID, a FIFO is empty when the head is equal to the tail.

Reject address storage 550 includes an entry for a thread reject address of each one of the thread pointer lists, e.g., thread0 reject address 504 for thread0 pointer list 530, thread1 reject address 555 for thread1 pointer list 531, and threadN reject address 558 for threadN pointer list 538. Base address storage 560 includes an entry for a thread base address of each one of the thread pointer lists, e.g., thread0 base address 501 for thread0 pointer list 530, thread1 base address 561 for thread1 pointer list 531, and threadN base address 568 for threadN pointer list 538.

Upon reset, all of the entries in ordered pointer list 540 are included in free entry pointer list 539. As thread data is pushed into multi-threaded FIFO memory 200, free entries are moved from free entry pointer list 539 to the thread pointer lists. For example, when data is pushed into FIFO storage 220 of multi-threaded FIFO memory 200 for thread0, a pointer stored in the tail of free entry pointer list 539, free entry 545, is moved to the tail of thread0 pointer list 530, and is stored as pointer to entryJ 541. Alternatively, free entry 544 from the head of free entry pointer list 539 may be moved to the tail of thread0 pointer list 530 and stored as pointer to entryJ 541. When an entry is moved within ordered pointer list 540, one or more rollback addresses, reject addresses, and base addresses may need to be changed. For example, when data is pushed into the FIFO for thread0, thread1 rollback address 503 is changed, i.e., incremented, to point to the entry storing pointer to entry0 542 within thread1 pointer list 531. Likewise, threadN rollback address 508 and free list base address 509 are also changed.

When an entry is moved from free entry pointer list to a thread pointer list, e.g., thread0 pointer list 530, thread1 pointer list 531, or threadN pointer list 538, entries "above" the moved entry are shifted up, so that each entry of ordered pointer list 540 is occupied and each entry within a thread pointer list remains in FIFO order. The entries are shifted up to absorb the removed entry in free entry pointer list 539, e.g., free entry 545. Note, that the order of the entries in free entry pointer list 539 is arbitrary. Therefore, any entry in free entry pointer list 539 may be moved when thread data is pushed. Similarly, an entry freed when thread data is popped may be inserted into any position within free entry pointer list 539.

When data is popped (committed) from FIFO storage 220 of multi-threaded FIFO memory 200 for thread1, a pointer stored in the head of thread1 pointer list 531, specifically at thread1 base address 503, is moved from thread1 pointer list 531 to free entry pointer list 539. Pointer to entry0 542 may be moved to the head or tail of free entry pointer list 539. When an entry in a thread FIFO is popped, and the corresponding pointer the entry is popped from a thread pointer list, such as pointer to entry0 542, entries "above" the popped pointer are shifted down, so that each entry of ordered pointer list 540 is occupied. Then the popped pointer may be moved to an entry in free entry pointer list. As previously explained with regard to pushing data, when data is popped one or more rollback, reject, and base addresses may need to be updated, e.g. decremented.

When a multi-ported memory is used for FIFO storage 220, a pop and push may occur simultaneously. Therefore, in addition to moving a first pointer from free entry pointer list 539 to a thread pointer list, a second pointer may be moved from the thread pointer list or another thread pointer list to free entry pointer list 539. When data is pushed and popped from a one thread FIFO and one thread pointer list, the rollback, reject, and base addresses are not changed and only entries within the thread pointer list are shifted. Otherwise, some entries in ordered pointer list 540 may be shifted up while other entries in ordered pointer list 540 are shifted down.

Figure 5C:
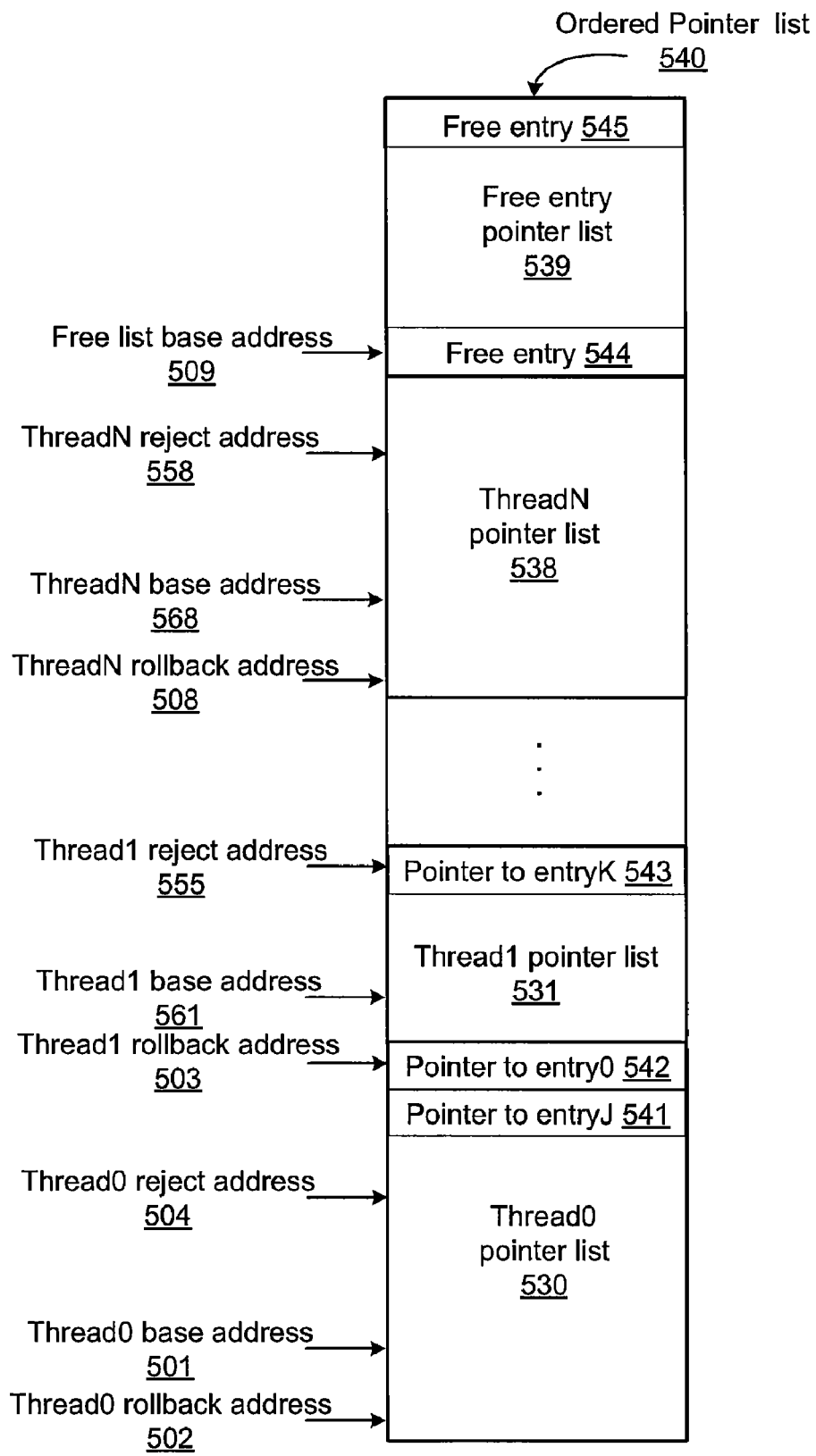
FIG. 5C illustrates another conceptual diagram of the ordered pointer list in accordance with one or more aspects of the present invention.

FIG. 5C illustrates another conceptual diagram of ordered pointer list 540 in accordance with one or more aspects of the present invention. When data for a thread is popped using a receiver commit request, the data is read and output from the head of the data FIFO for the thread. When a non-zero offset is provided with a take request, the data is read and output from the entry in the data FIFO corresponding to a sum of the base address for the thread and the offset. For example, when a take or peek request for thread1 is received by multi-threaded FIFO memory 200 with an offset, the offset is summed with thread1 rollback address 503 to produce thread1 entryK 504. Thread1 entryK 504 corresponds to the entry of thread1 pointer list 531, i.e, the K+1 entry in the thread1 FIFO, that stores pointer to entryK 543.

When the data stored in the entry of FIFO storage 220 corresponding to pointer to entryK 543 is requested using a take (when speculative reads are not supported), pointer to entryK 543 is moved from thread1 pointer list 531 to free entry pointer list 539. When speculative reads are supported, the pointer to entryK 543 remains in thread1 pointer list 531 until entryK 543 is committed. Specifically, when the data stored in the entry of FIFO storage 220 corresponding to pointer to entry0 542 is requested using a receiver commit, pointer to entry0 542 is moved from thread pointer list 531 to free entry pointer list 539.

Figure 6A:
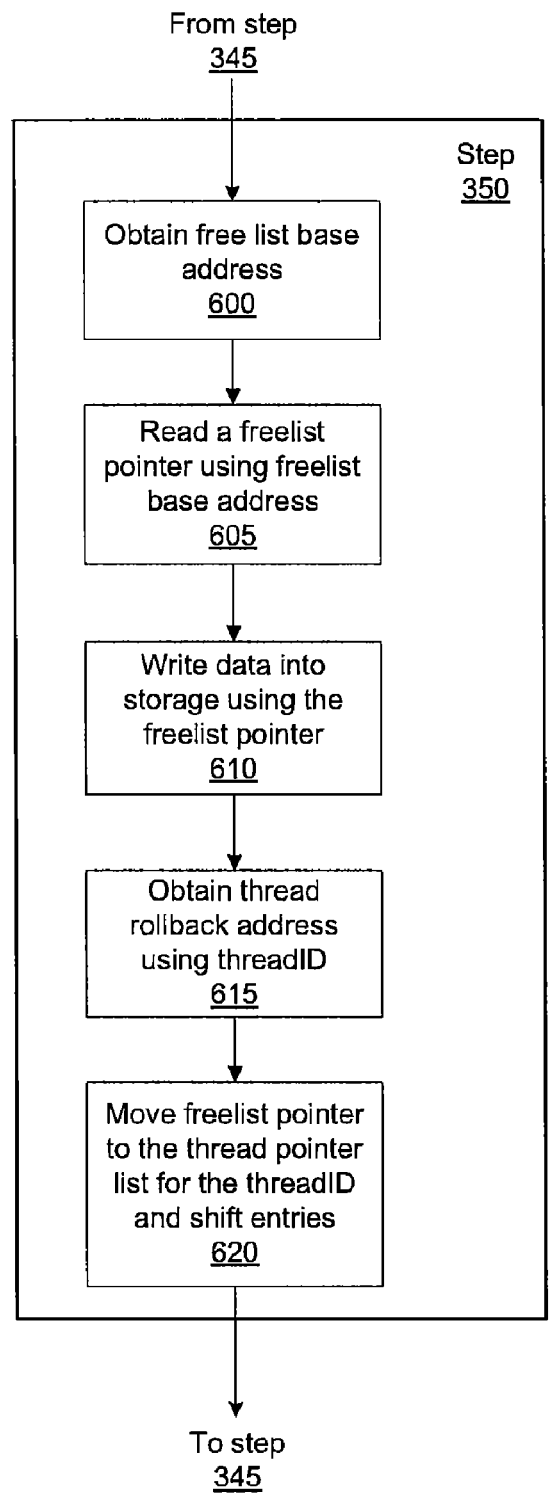
FIG. 6A illustrates a flow diagram of an exemplary method of performing step 350 shown in FIG. 3A in accordance with one or more aspects of the present invention.

FIG. 6A illustrates a flow diagram of an exemplary method of performing step 350 shown in FIG. 3A, in accordance with one or more aspects of the present invention. In step 350 thread data is pushed into multi-threaded FIFO memory 200. In step 600, read and write control 225 obtains free list base address 509 from rollback address storage 505. In step 605 read and write control 225 reads a free list pointer from free entry pointer list 539. The free list pointer may be read from the head entry of free entry pointer list 539 using free list base address 509 or from another entry within free entry pointer list 539. In step 610 read and write control 225 writes the thread data to the entry in FIFO storage 220 that corresponds to the free list pointer.

In step 615 read and write control 225 obtains the thread rollback address for the threadID included with the thread data that was pushed. The thread rollback address is read from rollback address storage 505. In step 620 the free list pointer is moved from free entry pointer list 539 to the thread pointer list that corresponds to the threadID by storing the free list pointer in the entry of ordered pointer list corresponding to the thread rollback address for the threadID+1. The entry storing the free list pointer becomes the tail of the thread FIFO for the threadID. In step 620 read and write control 225 shifts entries in ordered pointer list 540 as needed to move the free list pointer to the thread pointer list and proceeds to step 345.

Figure 6B:
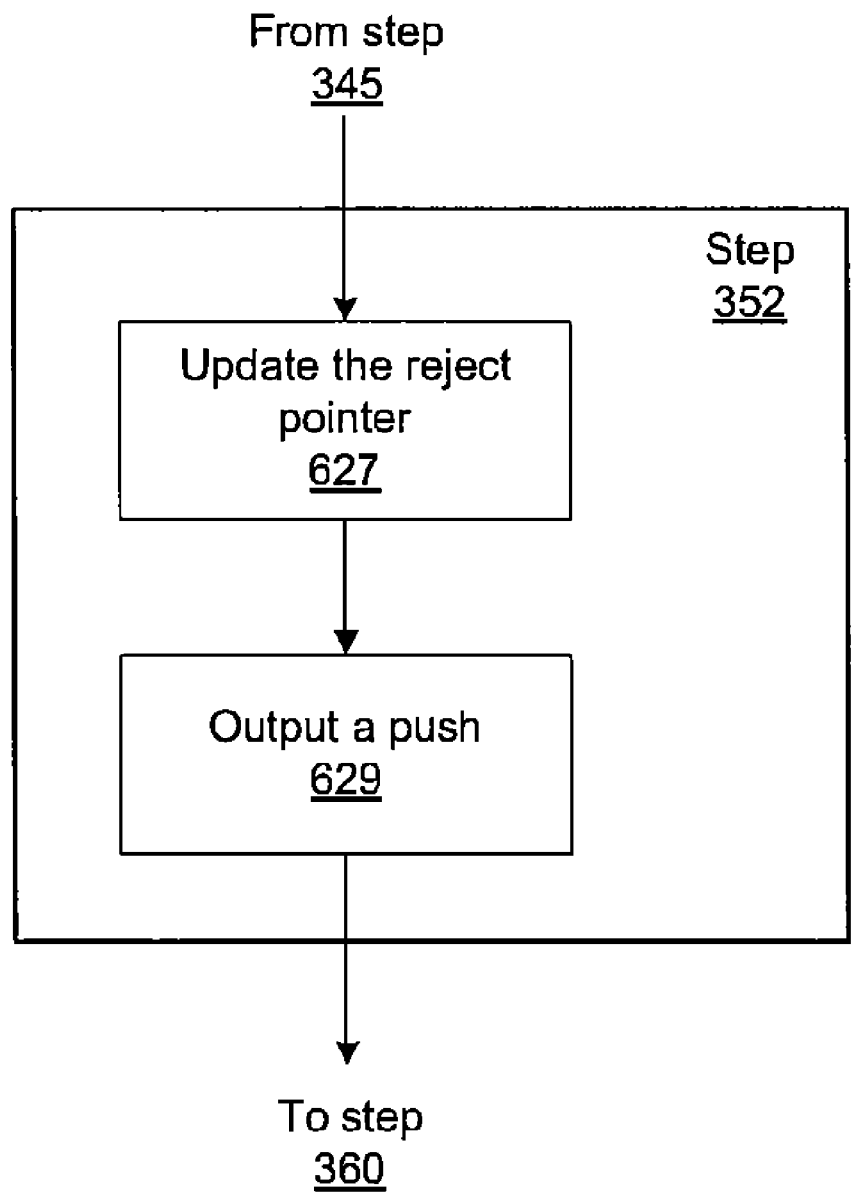
FIG. 6B illustrates a flow diagram of an exemplary method of performing step 352 shown in FIG. 3C in accordance with one or more aspects of the present invention.

FIG. 6B illustrates a flow diagram of an exemplary method of performing step 352 shown in FIG. 3C, in accordance with one or more aspects of the present invention. In step 352 thread data is committed to FIFO storage 220 in response to a sender commit request. In step 627 the thread reject address for the threadID is updated by incrementing the thread reject address in the thread pointer list for threadID. In step 629 sender interface 210 outputs a push to read and write control 225. Read and write control 225 outputs the push signal to receiver interface 230 in order to generate a receiver credit for the threadID.

Figure 6C:
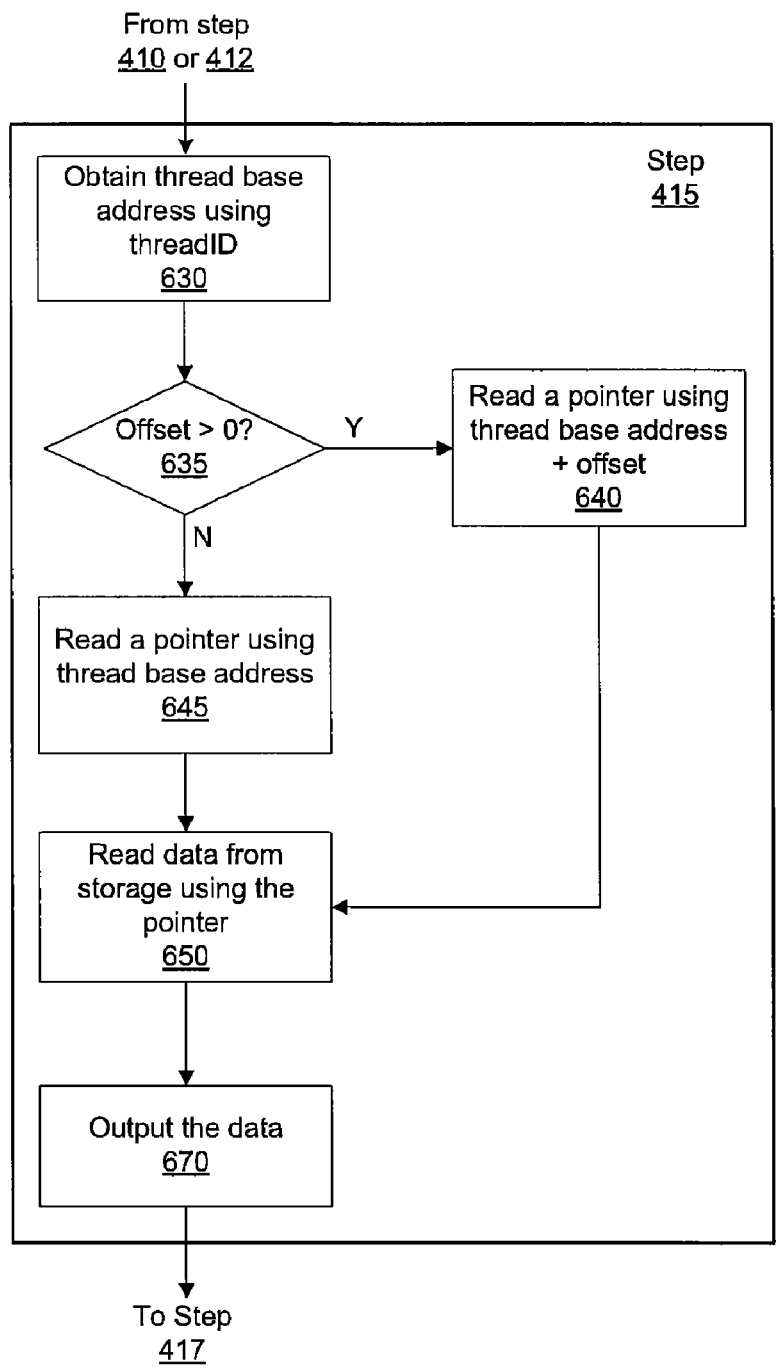
FIG. 6C illustrates a flow diagram of an exemplary method of performing step 415 shown in FIG. 4A in accordance with one or more aspects of the present invention.

FIG. 6C illustrates a flow diagram of an exemplary method of performing step 415 shown in FIG. 4A in accordance with one or more aspects of the present invention. In step 415 thread data is read from FIFO storage 220 in response to a peek or take request. In some embodiments of the present invention, an offset is not provided by the receiver with the take request.

In step 630 read and write control 225 obtains the thread base address for the threadID included with the take request. The thread base address is read from base address storage 560. In step 645 the pointer corresponding to the first entry in FIFO storage 220 (the head of the FIFO) for the threadID is read from the entry of the pointer list within ordered pointer list 540 that corresponds to the thread base address. In step 650 the thread data is read from the entry in FIFO storage 220 that corresponds to the pointer. In step 670 the thread data is output to the receiver via receiver interface 230 and read and write control 225 proceeds to step 417.

FIG. 6C illustrates a flow diagram of another exemplary method of performing step 420 shown in FIGS. 4A and 4C in accordance with one or more aspects of the present invention. In this embodiment of the present invention, an offset may be provided by the receiver with the take request.

In step 660 read and write control 225 updates the base addresses, one or more thread base addresses and/or free list base address 509, as needed. For example, the thread base address for threadID+1 is updated by decrementing the thread base address to accommodate the popped entry in the thread pointer list for threadID. Likewise, free list base address 509 is also decremented since an entry will be inserted in free entry pointer list 539. In step 665 the pointer is moved from the thread pointer list that corresponds to the threadID to free entry pointer list 539. In step 665 read and write control 225 also shifts entries in ordered pointer list 540 as needed to move the pointer to free entry pointer list 539.

Step 630 is completed as previously described to obtain the thread base address for the threadID included with the take request. In step 635 read and write control 225 determines if a non-zero offset is provided with the take request, and, if not, read and write control 225 proceeds to complete steps 645, 650, 660, 665, and 670 as previously described in conjunction with FIG. 6B. Otherwise, in step 640 the pointer corresponding to the entry in FIFO storage 220 for the threadID is read from the entry of the thread pointer list within ordered pointer list 540 that corresponds to the sum of the thread base address and offset. Steps 645, 650, 660, 665, and 670 are completed as previously described in conjunction with FIG. 6B.

Figure 6D:
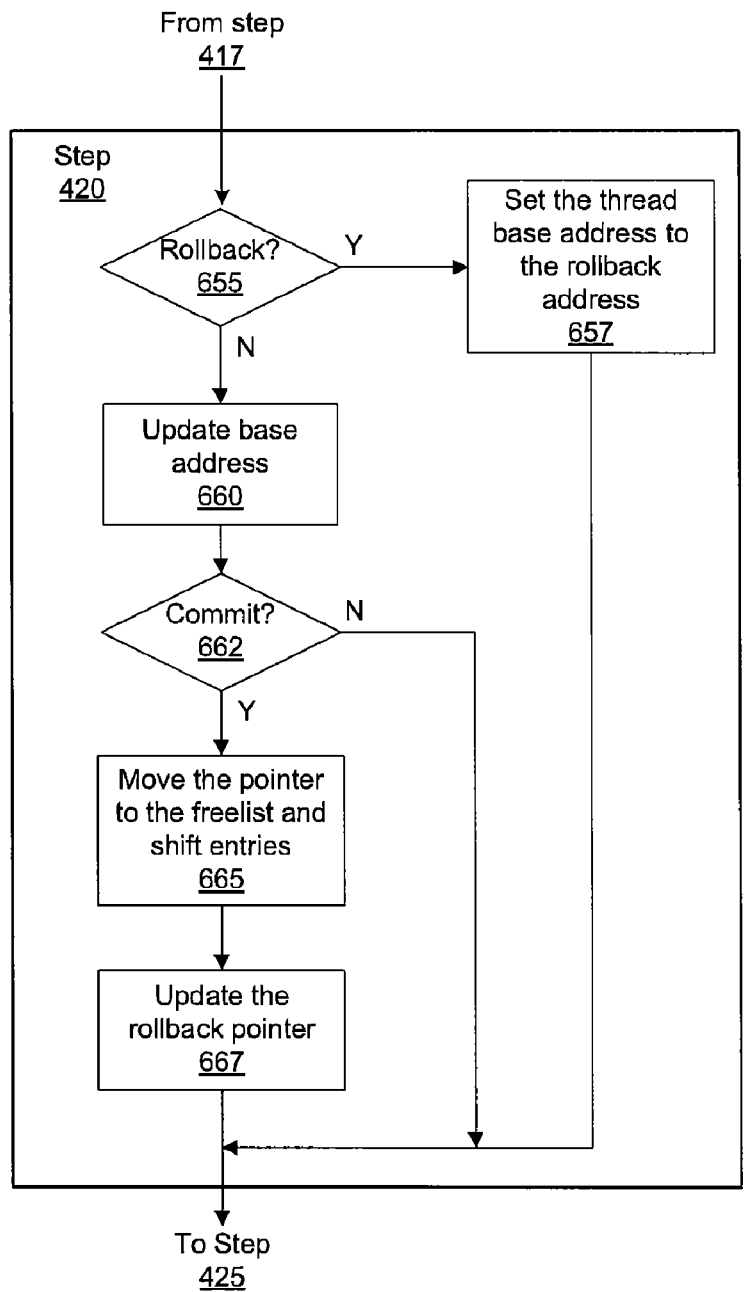
FIG. 6D illustrates a flow diagram of an exemplary method of performing step 420 shown in FIG. 4A in accordance with one or more aspects of the present invention.

FIG. 6D illustrates a flow diagram of an exemplary method of performing step 420 shown in FIG. 4A in accordance with one or more aspects of the present invention. In this embodiment of the present invention, an offset may be provided by the receiver with a take request or a peek request. In step 420 thread data is committed and removed from FIFO storage 220 in response to a receiver commit request.

In step 655 receiver interface 230 determines if a rollback request is received, and, if so, in step 657 read and write control 225 sets the thread base address to the rollback address to restore any read, but not committed entries for the threadID, before proceeding to step 425. Otherwise, in step 660 read and write control 225 updates the base address for the thread specified by receiver threadID 231 by incrementing the base address to point to the next entry for the thread.

In step 662 read and write control 225 determines if a receiver commit request is received, and, if not, then read and write control 225 proceeds directly to step 425. Otherwise, in step 665 read and write control 225 moves the pointer stored at the thread rollback address corresponding to the threadID to free entry pointer list 539. In step 665 read and write control 225 shifts entries in ordered pointer list 540 as needed to move the pointer from the thread pointer list to the free list pointer and proceeds to step 667. In step 667 read and write control 225 updates the thread rollback address corresponding to the threadID by incrementing it to point to the next oldest entry in the pointer list for the threadID and then proceeds to step 425.

The current invention involves new systems and methods for storing data for multi-threaded processing. Instead of using a separate FIFO memory to store data for each thread, a single memory, FIFO storage 220, is used to store data for multiple threads. The single memory is shared between the threads to conserve die area, however each thread may be executed independently, as if each thread has a dedicated FIFO memory. An ordered list of pointers for each thread is maintained to emulate a FIFO for the multiple execution threads. Speculative read and write capability may be included to allow FIFO storage 220 to read and write data and later pop and push the FIFO entries. Persons skilled in the art will appreciate that any system configured to perform the method steps of FIG. 1C, 1D, 1E, 1F, 1G, 3A, 3B, 3C, 4A, 4B, 6A, 6B, 6C, or 6D, or their equivalents, is within the scope of the present invention.

The current invention also involves new systems and methods for efficiently producing different variations of FIFO memories. In particular, a synthesizable code generator may be used to produce FIFO memories for multi-threaded processing. The synthesizable code generator produces synthesizable code for a sender interface, storage, receiver interface, and other features that are specified by a programmer. Inputs to the synthesizable code generator may be used to specify defined options for the sender interface, storage, and receiver interface. These options include a request/busy interface, a credit based interface, immediate credits, a take based interface, adding ports, removing ports, the type of storage devices, storage bypass, peek request logic, read offset logic, speculative write logic. Other features may also be specified using inputs to the synthesizable code generator. These features include an asynchronous interface to transfer signals between different clock domains, gating clock(s) to reduce power, and adding registers to input and/or output signals to improve timing.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A computer-implemented method for generating synthesizable code representing a multi-threaded first-in first-out (FIFO) storage memory, comprising:
    generating a first portion of the synthesizable code, wherein the first portion represents a sender interface with a first thread identifier input port and a write data input port that is configured to receive data for multiple execution threads;
    generating a second portion of the synthesizable code, wherein the second portion represents a storage resource configured to store the data for the multiple execution threads in a shared memory;
    generating a third portion of the synthesizable code, wherein the third portion represents a receiver interface with a second thread identifier input port, a speculative read port that is configured to provide a rollback capability for entries in the storage resource, and a read data output port that is configured to output the data for the multiple execution threads that corresponds to a thread identifier received by the second thread identifier input port; and
    configuring the multi-threaded FIFO storage memory based on at least one of the first portion, the second portion, or the third portion.

2. The method of claim 1, wherein the sender interface includes a credit based interface with a sender credit output port and the sender interface is configured to issue sender credits indicating a number of entries that are available in the multi-threaded FIFO storage memory.

3. The method of claim 2, wherein the sender interface is configured to assign thread identifiers to classes, allocate a number of entries in the storage resource for each one of the classes, and issue sender credits corresponding to each one of the thread identifiers based on the number of entries allocated to the class that includes each one of the thread identifiers.

4. The method of claim 3, wherein the sender interface includes a class limits input port and the sender interface is configured to issue sender credits without exceeding the class limits.

5. The method of claim 1, wherein the sender interface includes a speculative write port that is configured to provide a reject capability for entries in the storage resource.

6. The method of claim 1, wherein the sender interface receives a different clock than the receiver interface and a fourth portion of the synthesizable code represents asynchronous boundary logic configured to transfer signals between the sender interface and the receiver interface.

7. The method of claim 1, further comprising generating a fourth portion of the synthesizable code, wherein the fourth portion represents an ordered list of pointers that includes one pointer for each entry in the storage resource.

8. The method of claim 7, wherein the ordered list of pointers is configured to shift one or more of the pointers when a pointer is moved from a first position in the ordered list to a second position in the ordered list.

9. The method of claim 7, wherein the fourth portion of the synthesizable code represents an address storage resource for maintaining thread base addresses and thread rollback addresses for the multiple execution threads, wherein the thread base addresses each specify an address of a base pointer for a thread in the ordered list of pointers and the thread rollback addresses each specify an address of a rollback pointer for a thread in the ordered list of pointers.

10. The method of claim 9, wherein the fourth portion of the synthesizable code is configured to set a thread base address for a first thread to a rollback address of the first thread when a rollback request is received by the speculative read port.

11. The method of claim 9, wherein the fourth portion of the synthesizable code is configured to increment a rollback address when a commit request is received by the speculative read port.

12. The method of claim 9, wherein the address storage resource includes thread reject addresses for the multiple execution threads, wherein the thread reject addresses each specify an address of a reject pointer for a thread in the ordered list of pointers.

13. The method of claim 12, wherein the fourth portion of the synthesizable code is configured to increment one of the thread reject addresses when a commit request is received by the speculative write port.

14. The method of claim 12, wherein the fourth portion of the synthesizable code is configured to remove uncommitted entries from the storage resource when a reject request is received by the speculative write port.

15. A computer-readable storage medium, excluding transitory signal-bearing media, storing instructions for causing a processor to produce synthesizable code representing a multi-threaded first-in first-out (FIFO) storage memory by performing the steps of: generating a first portion of the synthesizable code, wherein the first portion represents a sender interface with a first thread identifier input port and a write data input port that is configured to receive data for multiple execution threads;
  generating a second portion of the synthesizable code, wherein the second portion represents a storage resource configured to store the data for the multiple execution threads in a shared memory;
  generating a third portion of the synthesizable code, wherein the third portion represents a receiver interface with a second thread identifier input port, a speculative read port that is configured to provide a rollback capability for entries in the storage resource, and a read data output port that is configured to output the data for the multiple execution threads that corresponds to a thread identifier received by the second thread identifier input port, and
  configuring the multi-threaded FIFO storage memory based on at least one of the first portion, the second portion, or the third portion.

16. The computer-readable storage medium of claim 15, wherein the sender interface includes a speculative write port that is configured to provide a reject capability for entries in the storage resource.

17. The computer-readable storage medium of claim 15, further comprising generating a fourth portion of the synthesizable code, wherein the fourth portion represents an ordered list of pointers that includes one pointer for each entry in the storage resource and the pointers are separated into free pointers that correspond to entries in the storage resource that are available to store data and thread pointers that correspond to entries in the storage resource that store data for the multiple execution threads.

18. The computer-readable storage medium of claim 17, wherein the fourth portion of the synthesizable code represents an address storage resource for maintaining thread base addresses and thread rollback addresses for the multiple execution threads, wherein the thread base addresses each specify an address of a base pointer for a thread in the ordered list of pointers and the thread rollback addresses each specify an address of a rollback pointer for a thread in the ordered list of pointers.

19. The computer-readable storage medium of claim 18, wherein the address storage resource includes thread reject addresses for the multiple execution threads, wherein the thread reject addresses each specify an address of a reject pointer for a thread in the ordered list of pointers.

20. The computer-readable storage medium of claim 16, wherein the sender interface receives a different clock than the receiver interface and a fourth portion of the synthesizable code represents asynchronous boundary logic configured to transfer signals between the sender interface and the receiver interface.

* * * * *